United States Patent
St. Clair

(10) Patent No.: US 9,712,800 B2
(45) Date of Patent: Jul. 18, 2017

(54) AUTOMATIC IDENTIFICATION OF A NOTABLE MOMENT

(71) Applicant: Google Inc., Mountain View, CA (US)

(72) Inventor: Timothy Sepkoski St. Clair, San Francisco, CA (US)

(73) Assignee: Google Inc., Mountain View, CA (US)

( * ) Notice: Subject to any disclaimer, the term of this patent is extended or adjusted under 35 U.S.C. 154(b) by 6 days.

(21) Appl. No.: 13/731,681

(22) Filed: Dec. 31, 2012

(65) Prior Publication Data

US 2014/0178050 A1 Jun. 26, 2014

Related U.S. Application Data

(63) Continuation-in-part of application No. 13/722,683, filed on Dec. 20, 2012.

(51) Int. Cl.
| | |
|---|---|
| *H04N 9/82* | (2006.01) |
| *H04N 5/76* | (2006.01) |
| *H04N 5/91* | (2006.01) |
| *H04N 9/806* | (2006.01) |

(52) U.S. Cl.
CPC ............ *H04N 9/8211* (2013.01); *H04N 5/76* (2013.01); *H04N 5/91* (2013.01); *H04N 9/806* (2013.01)

(58) Field of Classification Search
USPC ........................................ 705/14.66; 370/338
See application file for complete search history.

(56) References Cited

U.S. PATENT DOCUMENTS

| | | | |
|---|---|---|---|
| 7,606,706 B1 | 10/2009 | Rubin et al. | |
| 7,787,762 B2 * | 8/2010 | Abe ................... | H04N 5/23212 348/222.1 |

(Continued)

FOREIGN PATENT DOCUMENTS

| | | |
|---|---|---|
| KR | 20090035851 | 4/2009 |
| KR | 20120063273 | 12/2012 |

(Continued)

OTHER PUBLICATIONS

International Search Report for PCT Application No. PCT/US2013/077471 dated Apr. 10, 2014, 10 pages.

(Continued)

*Primary Examiner* — Fonya Long
*Assistant Examiner* — Marie Brady
(74) *Attorney, Agent, or Firm* — Patent Law Works LLP

(57) ABSTRACT

A system and method for identifying one or more notable moments from video data are disclosed. In one embodiment, the system includes a video receiving module, an identification criteria module, a moment identification module and a presentation module. The video receiving module receives video data. The identification criteria module determines one or more criteria for identifying a notable moment. The one or more criteria are based at least in part on one or more of an audio indicator and a facial indicator. The moment identification module automatically identifies at least one notable moment in the video data based at least in part on the one or more criteria. The at least one notable moment is based on a subset of the video data. The presentation module sends the identified at least one notable moment for presentation to at least one user.

20 Claims, 8 Drawing Sheets

(56) References Cited

U.S. PATENT DOCUMENTS

| | | | |
|---|---|---|---|
| 8,300,953 B2* | 10/2012 | Lindley | G06F 17/30038 |
| | | | 382/190 |
| 2002/0049595 A1 | 4/2002 | Bennett et al. | |
| 2003/0061612 A1 | 3/2003 | Lee et al. | |
| 2003/0187632 A1 | 10/2003 | Menich | |
| 2004/0052218 A1* | 3/2004 | Knappe | H04M 3/42187 |
| | | | 370/260 |
| 2004/0143630 A1 | 7/2004 | Kaufmann et al. | |
| 2004/0181747 A1 | 9/2004 | Hull et al. | |
| 2006/0257840 A1 | 11/2006 | Risch et al. | |
| 2006/0286530 A1 | 12/2006 | Forrest et al. | |
| 2007/0037599 A1 | 2/2007 | Tillet et al. | |
| 2007/0201815 A1* | 8/2007 | Griffin | G11B 27/034 |
| | | | 386/231 |
| 2008/0021710 A1 | 1/2008 | Ho | |
| 2008/0310725 A1 | 12/2008 | Kurata et al. | |
| 2009/0007202 A1 | 1/2009 | Williams et al. | |
| 2009/0185626 A1 | 7/2009 | Seupel et al. | |
| 2009/0186330 A1 | 7/2009 | Brownholtz et al. | |
| 2009/0248659 A1 | 10/2009 | McCool et al. | |
| 2010/0017716 A1* | 1/2010 | Weda | G11B 27/034 |
| | | | 715/719 |
| 2010/0067863 A1* | 3/2010 | Wang | G11B 27/034 |
| | | | 386/279 |
| 2011/0105857 A1 | 5/2011 | Zhang et al. | |
| 2011/0157475 A1* | 6/2011 | Wright | G06K 9/00765 |
| | | | 348/700 |
| 2011/0304774 A1 | 12/2011 | Latta et al. | |
| 2012/0010884 A1* | 1/2012 | Kocks | G10L 17/00 |
| | | | 704/240 |
| 2012/0076357 A1 | 3/2012 | Yamamoto et al. | |
| 2012/0102033 A1 | 4/2012 | Sarshar et al. | |
| 2012/0130969 A1 | 5/2012 | Wong et al. | |
| 2012/0148213 A1 | 6/2012 | Bamba et al. | |
| 2012/0200737 A1* | 8/2012 | Jape | H04N 5/772 |
| | | | 348/231.2 |
| 2012/0213212 A1* | 8/2012 | Moore | H04N 5/77 |
| | | | 370/338 |
| 2013/0275504 A1* | 10/2013 | Patel | G06Q 10/10 |
| | | | 709/204 |

FOREIGN PATENT DOCUMENTS

| | | |
|---|---|---|
| WO | 03/071775 | 8/2003 |
| WO | 2013/149027 | 10/2013 |

OTHER PUBLICATIONS

Extended European Search Report for EP 13869672.9, dated Jun. 17, 2016, 10 pgs.

* cited by examiner

AUTOMATIC IDENTIFICATION OF A NOTABLE MOMENT

CROSS-REFERENCE TO RELATED APPLICATION

The present application claims priority, under 35 U.S.C. §120, to U.S. patent application Ser. No. 13/722,683, filed Dec. 20, 2012, and entitled "Segmenting a Recording of a Multi-Party Communication Session into Question and Answer Units," the entire contents of which are hereby incorporated by reference.

BACKGROUND

Photographers seek to capture moments. In particular, photographers seek to capture those moments when something "magical" or otherwise identifiable happens, for example, a person's face when his/her partner proposes marriage or when something hysterical happens. Video makes capturing a moment easier by capturing a period of time. However, playback of an entire video to view a moment is time consuming and often undesirable, e.g., when the video is long. Video may be edited to include only the notable moments, e.g., in video clips or in images taken from the video frames. However, current systems for editing the video to only the notable moment(s) is time consuming and is often not performed. This may be especially true in situations where there is not a dedicated photographer. One thing that has been missing is the ability to automatically identify one or more notable moments in a video and automatically generate a subset of the video including the one or more notable moments. Another thing that has been missing is a process by which companies can present communication sessions as part of their advertising and identify one or more notable moments in video of the multi-party communication session.

SUMMARY

The specification overcomes the deficiencies and limitations of the prior art at least in part by providing a system and method for identifying one or more notable moments from video data. The specification relates to identifying one or more notable moments from video data.

According to one innovative aspect of the subject matter described in this disclosure, a video receiving module receives video data. An identification criteria module determines one or more criteria for identifying a notable moment. The one or more criteria are based at least in part on one or more of an audio indicator and a facial indicator. A moment identification module automatically identifies at least one notable moment in the video data based at least in part on the one or more criteria. The at least one notable moment is based on a subset of the video data. A presentation module sends the identified at least one notable moment for presentation to at least one user.

In general, another innovative aspect of the subject matter described in this disclosure may be embodied in methods that include receiving, using one or more devices, video data; determining, using the one or more devices, one or more criteria for identifying a notable moment, the one or more criteria based at least in part on one or more of an audio indicator and a facial indicator; automatically identifying, using the one or more devices, at least one notable moment in the video data based at least in part on the one or more criteria, the notable moment based on a subset of the video data; and sending, using the one or more devices, the identified at least one notable moment for presentation to at least one user.

Other aspects include corresponding methods, systems, apparatus and computer program products. These and other implementations may each optionally include one or more of the following features. For instance, the features further include: responsive to identifying a plurality of notable moments, comparing, using the one or more devices, each of the plurality notable moments to one another; determining, using the one or more devices, that the plurality of notable moments includes similar notable moments; and selecting, using the one or more devices, a first similar notable moment from the similar notable moments and wherein the first similar notable moment is sent for presentation. For instance, the features include one or more of: the first notable moment is selected based at least in part on color saturation; the received video data is a video data stream and the automatic identification of the notable moment is synchronous with the reception of the video data stream; the video data is a live video stream from a multi-party communication session; the audio indicator includes one or more of a volume spike, applause and laughter; the facial indicator is based at least in part on facial recognition and includes one or more of the presence of one or more human faces, the one or more human faces facing the camera, the present human faces having open eyes and the present human faces smiling; the notable moment is an image based on a video frame; and the notable moment is a video clip.

The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The embodiments are illustrated by way of example, and not by way of limitation, in the figures of the accompanying drawings in which like reference numerals are used to refer to similar elements.

DETAILED DESCRIPTION

Figure 1:
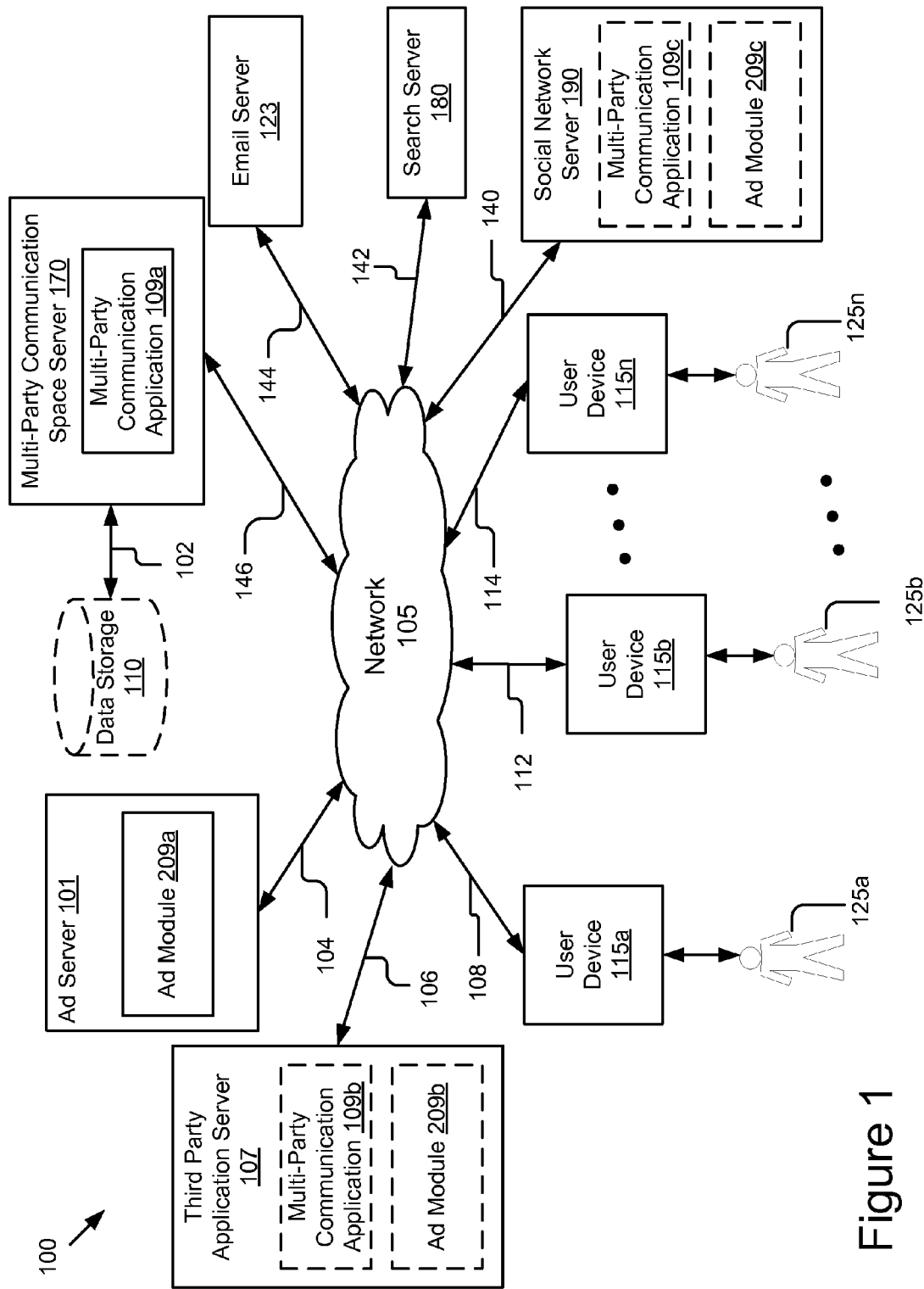
FIG. 1 illustrates a system for identifying one or more notable moments from video data according to one embodiment.

A system and method for identifying one or more notable moments from video data are disclosed. As an example, capturing a moment is difficult especially when the moment is not staged and/or is fleeting (e.g., a well-timed joke, a batter hitting a baseball or a player catching a touchdown pass). Capturing the moment is made easier by recording video and storing the video as video data. The video spans a period of time including a notable moment; however, the video may often include moments that are insignificant and are undesired. Identifying the notable moments (i.e., the significant and/or desirable moments) in the video data using existing methods of post-production editing is time consuming and not ideal; therefore, a mechanism which reduces or eliminates the time a user must spend to identify a notable moment is desirable.

For example, in one embodiment, a moment module receives video data, determines one or more criteria, automatically identifies one or more notable moments based on the one or more criteria, and presents the one or more notable moments to at least one user. The criteria may include one or more of an audio indicator (e.g., a volume spike, laughter, applause, etc.) and a facial indicator (a smile, open eyes, a surprised facial expression, etc.). The one or more notable moments are based on a subset of video data and, in one embodiment, include an image, a video clip or a combination thereof.

In the following description, for purposes of explanation, numerous specific details are set forth in order to provide a thorough understanding of the embodiments. It will be apparent, however, to one skilled in the art that the embodiments can be practiced without these specific details. In other instances, structures and devices are shown in block diagram form in order to avoid obscuring the embodiments. For example, one embodiment is described below with reference to user interfaces and particular hardware. However, the present embodiments apply to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including, for example, "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but not limited to, any type of disk (e.g., floppy disks, optical disks, CD-ROMs, and magnetic disks), read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

Some embodiments can take the form of an entirely hardware embodiment, an entirely software embodiment or an embodiment containing both hardware and software elements. An exemplary embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

FIG. 1 illustrates a block diagram of a system 100 for identifying one or more notable moments from video data according to one embodiment. The illustrated system 100 includes user devices 115a, 115b, and 115n (also referred to collectively as user devices 115 or individually as user device 115) that are accessed by users 125a, 125b, and 125n (also referred to collectively as users 125 or individually as user 125), an ad server 101, a multi-party communications space server 170, an e-mail server 123, a search server 180, a social network server 190, and a third party application server 107. In the illustrated embodiment, these entities are communicatively coupled via a network 105. Although only three user devices 115 are illustrated, any number of user devices 115 are available to any number of users 125.

The user devices 115 in FIG. 1 are used by way of example. While FIG. 1 illustrates three user devices 115, the present specification applies to any system architecture having one or more user devices 115. Furthermore, while only one network 105 is coupled to the user devices 115, the third party application server 107, the ad server 101, the search server 180, the e-mail server 123, the social network server 190 and the multi-party communications space server 170, in practice any number of networks 105 can be connected to the entities. Furthermore, while only one third party server 107, one email server 123, one search server 180, and one social network server 190 are shown, the system 100 can include any number of servers 107, 123, 180, and 190.

Although only one multi-party communication space server 170 is shown, it will be recognized that multiple servers 170 may be present. In one embodiment, the multi-party communication space server 170 comprises, or is comprised within, a social network. A social network is any type of social structure where the users are connected by a common feature. Examples include, but are not limited to, blogs, microblogs and Internet forums. The common feature includes friendship, family, a common interest, etc.

In one embodiment, a multi-party communication application 109a is included in the multi-party communication space server 170 and is operable on the multi-party communication space server 170, which is connected to the network 105 via signal line 146. In another embodiment, a multi-party communication application 109b is included in the third party application server 107 and is operable on the third party application server 107, which is connected to the network 105 via signal line 106. In another embodiment, a multi-party communication application 109c is included in the social network server 190 and is operable on the social network server 190, which is connected to the network 105 via signal line 140. In yet another embodiment, a multi-party communication application (not shown) may be included in one or more of the other computing devices 115, 123 and is operable on the one or more other devices 115, 123, respectively. It will be recognized that the multi-party communication application 109a/109b/109c (referred to generally as the multi-party communication application 109) can be stored in any combination on the servers 101, 107, 170, 190 and user devices 115. In some embodiments, the multi-party communication application 109 includes multiple, distributed modules that cooperate with each other to perform the functions described below. Details describing the functionality and components of the multi-party communication application 109 are explained in further detail below with regard to FIGS. 3, 4 and 7 according to one embodiment.

Although only one ad server 101 is shown, it will be recognized that multiple ad servers 101 may be present. In one embodiment, an ad module 209a is included in the ad server 101 and is operable on the ad server 101, which is connected to the network 105 via signal line 104. In another embodiment, an ad module 209b is included in the third party application server 107 and is operable on the third party application server 107, which is connected to the network 105 via signal line 106. In another embodiment, an ad module 209c is included in the social network server 190 and is operable on the social network server 190, which is connected to the network 105 via signal line 140. In yet another embodiment, an ad module (not shown) may be included in one or more of the other computing devices 115, 123 and is operable on the one or more other devices 115, 123, respectively. It will be recognized that the ad module 209a/209b/209c (referred to generally as the ad module 209) can be stored in any combination on the servers 101, 107, 170, 190 and user devices 115. In some embodiments, the ad module 209 includes multiple, distributed modules that cooperate with each other to perform the functions described below. Details describing the functionality and components of the ad module 209 are explained in further detail below with regard to FIG. 2.

The network 105 enables communications between user devices 115, the ad server 101, the multi-party communication space server 170, the search server 180, the e-mail server 123, the social network server 190, and the third party application 107 server. Thus, the network 105 can include links using technologies including, for example, Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 105 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 105 can be represented using technologies and/or formats including the hypertext markup language (HTML), the extensible markup language (XML), etc. In addition, all or some of links can be encrypted using conventional encryption technologies, for example, the secure sockets layer (SSL), Secure HTTP and/or virtual private networks (VPNs) or Internet Protocol security (IPsec). In another embodiment, the entities can use custom and/or dedicated data communications technologies instead of, or in addition to, the ones described above. Depending upon the embodiment, the network 105 can also include links to other networks.

In one embodiment, the network 105 is a partially public or a wholly public network, for example, the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wireline or wireless (i.e., terrestrial or satellite-based transceivers). In one embodiment, the network 105 is an IP-based wide or metropolitan area network.

In some embodiments, the network 105 helps to form a set of online relationships between users 125, for example, those provided by one or more social networking systems including explicitly-defined relationships and relationships implied by social connections with other online users, where the relationships form a social graph. In some examples, the social graph can reflect a mapping of these users and how they are related.

In the illustrated embodiment, the user devices 115a, 115b and 115n are coupled to the network 105 via signal lines 108, 112 and 114, respectively. The user 125a can interact with the user device 115a. Similarly, the user 125b can interact with the user device 115b, and the user 125n can interact with the user device 115n. The third party application server 107 is communicatively coupled to the network 105 via signal line 106. The e-mail server 123 is communicatively coupled to the network 105 via signal line 144. The search server 180 is communicatively coupled to the network 105 via signal line 142. The ad server 101 is communicatively coupled to the network 105 via signal line 104. The multi-party communication space server 170 is communicatively coupled to the network 105 via signal line 146. In one embodiment, the multi-party communication space server 170 is communicatively coupled to data storage 110 via signal line 102. The social network server 190 is communicatively coupled to the network 105 via signal line 140.

In one embodiment, the data storage 110 stores data and information including one or more of multi-party communication session data and segments thereof. In one embodiment, multi-party communication session data comprises a recording of a multi-party communication session and a segment of multi-party communication session data comprises a segment of a recording of a multi-party communication session. In one embodiment, the multi-party communication session data includes video data. In one embodiment, which is discussed below, a storage device 214 (see FIG. 2) is included in the multi-party communication space server 170 (i.e., a computing device 200) and the storage device 214 stores the data and information including one or more of multi-party communication session data and segments thereof.

In one embodiment, the user device 115 is an electronic device having a web browser (not shown) for interacting with the various servers 101, 107, 123, 170, 180, 190 and user devices 115 of the system 100 via the network 105 and is used by a user 125 to access information in the system 100. The user device 115 can be, for example, a laptop computer, a desktop computer, a tablet computer, a mobile telephone, a personal digital assistant (PDA), a mobile email device, a portable game player, a portable music player or any other electronic device capable of accessing a network. One having ordinary skill in the art will recognize that other types of client devices 115 are possible. In one embodiment, the system 100 comprises a combination of different types of client devices 115. For example, a combination of a personal computer, a mobile phone and a tablet computer. The user 125 is a human user of the user device 115.

Figure 2:
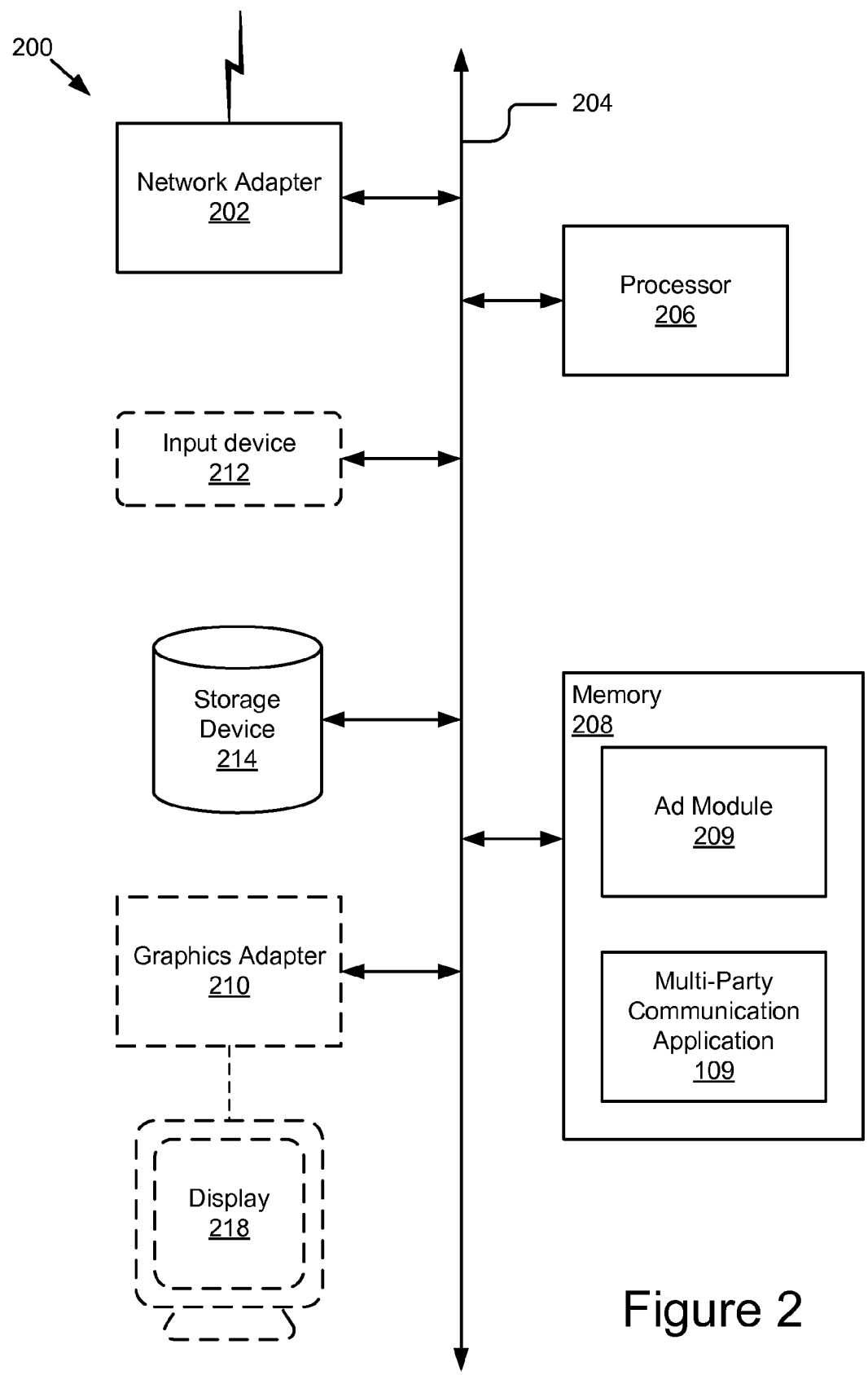
FIG. 2 is a block diagram illustrating a computing device according to one embodiment.

FIG. 2 is a block diagram of a computing device 200 according to one embodiment. As illustrated in FIG. 2, the computing device 200 includes a network adapter 202, processor 206, memory 208, and a storage device 214 coupled to a bus 204. In one embodiment, the memory includes one or more of an ad module 209 and a multi-party communication application 109. In one embodiment, the functionality of the bus 204 is provided by an interconnecting chipset. According to one embodiment also coupled to the bus 204 are a graphics adapter 210, an input device 212, a graphics adapter 210, and a display 218, which is coupled to the graphics adapter 210.

The network adapter 202 sends data to and receives data from the various system 100 components (e.g., user devices 115, third party application server 107, social network server 190, etc.). The network adapter 202 is coupled to the bus 204. In one embodiment, the network adapter 202 includes a port for direct physical connection to the network 105 or to another communication channel. For example, the network adapter 202 includes a USB, SD, CAT-5, or similar port for wired communication with the network 105. In another embodiment, the network adapter 202 includes a wireless transceiver for exchanging data with the network 105, or with another communication channel, using one or more wireless communication methods, such as IEEE 802.11, IEEE 802.16, BLUETOOTH®, near field communication (NFC) or another suitable wireless communication method.

The processor 206 may be any general-purpose processor. The processor 206 comprises an arithmetic logic unit, a microprocessor, a general purpose controller or some other processor array to perform computations and execute code and routines. The processor 206 is coupled to the bus 204 for communication with the other components of the computing device 200. Processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. The computing device 200 also includes an operating system executable by the processor including but not limited to WINDOWS®, MacOS X, Android or UNIX® based operating systems. It will be obvious to one skilled in the art that other processors, operating systems, sensors, displays, and physical configurations are possible.

The memory 208 is a non-transitory storage medium. The memory 208 holds instructions and/or data that may be executed by the processor 206. In one embodiment, the instructions and/or data stored on the memory 208 comprise code for performing any and/or all of the techniques described herein. The memory 208 may be a dynamic random access memory (DRAM) device, a static random access memory (SRAM) device, flash memory, or some other memory device known in the art. In one embodiment, the memory 208 also includes a non-volatile memory or similar permanent storage device and media, for example, a hard disk drive, a floppy disk drive, a CD-ROM device, a DVD-ROM device, a DVD-RAM device, a DVD-RW device, a flash memory device, or some other mass storage device known in the art for storing information on a more permanent basis. The memory 208 is coupled by the bus 204 for communication with the other components of the computing device 200. In one embodiment, one or more of the ad module 209 and the multi-party communication application 109 are stored in memory 208 and executable by the processor 206.

In one embodiment, the computing device 200 includes an ad module 209. For example, in one embodiment, the computing device 200 is an ad server 101. The ad module 209 includes code and routines executable by the processor 206 for selecting an advertisement for display based on one or more keyword signals. In one embodiment, the ad module 209 is a set of instructions executable by the processor 206. In another embodiment, the ad module 209 is stored in the memory 208 and is accessible and executable by the processor 206.

In one embodiment, the ad module 209 selects an advertisement associated with a multi-party communication session based at least in part on a keyword signal. In one embodiment, an advertisement associated with a multi-party communication session builds a brand associated with advertisement. For example, in one embodiment, a multi-party communication session associated with an advertisement is staffed by an employee or representative of the advertiser who acts as a moderator and can answer questions. The advertiser receives goodwill from users who receive answers to questions, and the advertiser has a stronger brand because of the interaction with users.

In one embodiment, the computing device 200 includes a multi-party communication application 109. For example, in one embodiment, the computing device 200 is a multi-party communication space server 170. The multi-party communication application 109 includes code and routines executable by the processor 206 for initiating and maintaining a multi-party communication session and for segmenting a recording of a multi-party communication session into question and answer units. In one embodiment, the multi-party communication application 109 is a set of instructions executable by the processor 206. In another embodiment, the multi-party communication application 109 is stored in the memory 208 and is accessible and executable by the processor 206. Details describing the functionality and components of the multi-party communication application 109 are explained in further detail below in reference to FIGS. 3, 4 and 7.

In one embodiment, the computing device 200 is a social network server 190. An embodiment of the social network server 190 allows users 125 of user devices 115 to perform social functions between other users 125 of user devices 115 within the system 100. In one embodiment, the social network server 190 comprises, or is comprised within, a social network. In another embodiment, the computing device 200 is an email server 123. In another embodiment, the computing device 200 is a third party server 107. In another embodiment, the computing device 200 is a search server 180.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 206 and comprises one or more devices including a hard disk drive, a floppy disk drive, a CD-ROM device, a DVD-ROM device, a DVD-RAM device, a DVD-RW device, a flash memory device, or some other mass storage device known in the art. In one embodiment, the computing device 200 is an ad server 101 and the storage device 214 stores data and information of each advertisement of the ad server 101. In one embodiment, the computing device 200 is a multi-party communication space server 170 and the storage device 214 stores data and information including data and information of each multi-party communication session.

The input device 212 may include a mouse, track ball, or other type of pointing device to input data into the computing device 200. The input device 212 may also include a keyboard, for example, a QWERTY keyboard or any other physical or soft keyboard in any language. The input device 212 may also include a microphone, a web camera or similar audio or video capture device. The graphics adapter 210 displays images and other information on the display 218. The display 218 is a conventional type, for example, a liquid crystal display (LCD) or any other similarly equipped display device, screen, touchscreen, or monitor. The display 218 represents any device equipped to display electronic images and data as described herein. The network adapter 202 couples the computing device 200 to a local or wide area network.

As is known in the art, a computing device 200 can have different and/or other components than those shown in FIG. 2. For example, the computing device can have speakers or another form of audio output. Moreover, the computing device 200 can lack certain illustrated components. For example, in one embodiment, the computing device 200 is a multi-party communication space server 170 and lacks an input device 212, graphics adapter 210 and/or display 218. Moreover, the storage device 214 can be local and/or remote from the computing device 200 (e.g., a storage area network (SAN)).

As is known in the art, the computing device 200 is adapted to execute computer program modules for providing the functionality described herein. As used herein, the term "module" refers to computer program logic utilized to provide the specified functionality. Thus, a module can be implemented in hardware, firmware, and/or software. In one embodiment, program modules are stored on the storage device 214, loaded into the memory 208 and executed by the processor 206.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
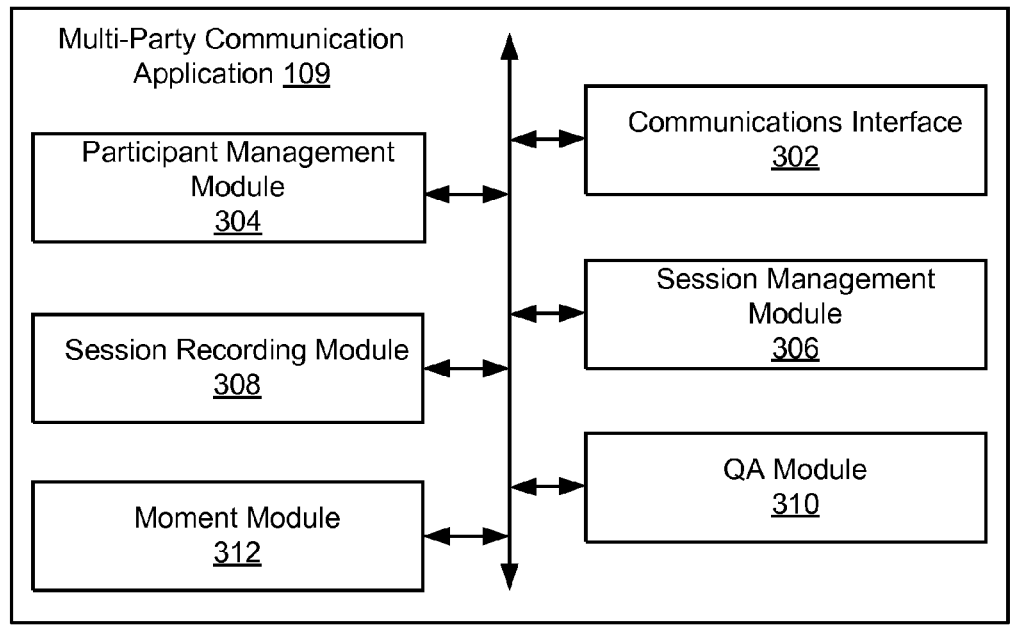
FIG. 3 is a block diagram illustrating a multi-party communication application according to one embodiment.

Referring now to FIG. 3, the multi-party communication application 109 is shown in more detail according to one embodiment. FIG. 3 is a block diagram of the multi-party communication application 109 included in a computing device 200 (e.g., a multi-party communication space server 170) according to one embodiment.

In one embodiment, the multi-party communication application 109 comprises a communications interface 302, a participant management module 304, a session management module 306, a session recording module 308, a question and answer module 310 and a moment module 312. The question and answer module 310 is occasionally referred to herein as the QA module 310. In one embodiment, the multi-party communication application 109 includes the moment module and the QA module 310 is optionally omitted (not shown).

It will be recognized that the modules 302, 304, 306, 308, 310, 312 comprised in the multi-party communication application 109 are not necessarily all on the same computing device 200. In one embodiment, the modules 302, 304, 306, 308, 310, 312 are distributed across multiple computing devices 200. For example, in one embodiment, the moment module 312 is included in one multi-party communication space server 170 and the other modules 302, 304, 306, 308, 310 are included in another multi-party communication space server 170. In another example, the moment module 312 is included in a social network server 190 and the other modules 302, 304, 306, 308, 310 are included in a multi-party communication space server 170. It will be recognized that the preceding are just examples of distributing modules across multiple computing devices 200 and that other examples exist.

The communication interface 302 includes code and routines for handling communications between the participant management module 304, the session management module 306, the session recording module 308, the question and answer module 310, the moment module 312 and other components of the computing device 200. In one embodiment, the communication interface 302 is a set of instructions executable by the processor 206. In another embodiment, the communication interface 302 is stored in the memory 208 and is accessible and executable by the processor 206. In either embodiment, the communication interface 302 is adapted for cooperation and communication with the processor 206, other components of the computing device 200 and other components of the multi-party communication application 109.

The communication interface 302 handles communications between the participant management module 304, the session management module 306, the session recording module 308, the question and answer module 310 and other components of the computing device 200. For example, the communication interface 302 communicates with the session recording module 308 and one or more of the QA module 310 and the moment module 312 to pass the output of the session recording module 308 (i.e., multi-party communication session data) to the QA module 310 and/or moment module 312. However, this description may occasionally omit mention of the communication interface 302 for purposes of clarity and convenience. For example, for purposes of clarity and convenience, the above scenario may be described as the session recording module 308 passing the multi-party communication session data to the QA module 310 and/or moment module 312.

The participant management module 304 includes code and routines for managing the participants of a multi-party communication session. In one embodiment, the participant management module 304 is a set of instructions executable by the processor 206. In another embodiment, the participant management module 304 is stored in the memory 208 and is accessible and executable by the processor 206. In either embodiment, the participant management module 304 is adapted for cooperation and communication with the processor 206, other components of the computing device 200 and other components of the multi-party communication application 109.

The participant management module 304 manages the participants of a multi-party communication session. For example, the participant management module 304 adds and removes participants from the multi-party communication session. An embodiment of the multi-party communication application 109 allows participants of a multi-party communication session to communicate. For example, in one embodiment, participants of the multi-party communication session are all connected to the computing device 200, which is a central server including a multi-party communication application 109 (e.g., a multi-part communication space server 170). In another embodiment, a multi-party communication session uses peer-to-peer communication.

A multi-party communication session allows for one or more of audio and visual communication. Examples of a multi-party communication session include but are not limited to one or more of a chat session, voice conference, video conference, etc. In one embodiment, a multi-party communication session displays video or other representations of participating users. In one such embodiment, the multi-party communication session includes both audio and video communication.

In one embodiment, the multi-party communication session includes a primary participant (e.g., a moderator) and one or more secondary participants and the multi-party communication application 109 allows the users to communicate with one another.

The participant management module 304 adds users to the multi-party communication session. In one embodiment, the participant management module 304 adds a secondary participant to a multi-party communication session associated with an advertisement responsive to that user selecting a selection element associated with the advertisement. For example, assume a user selects a selection element of an advertisement associated with a multi-party communication session, in one embodiment, the participant management module 304 adds the user to the multi-party communication session associated with that advertisement as a participant.

In one embodiment, a user can select to be a passive participant or an active participant in the multi-party communication session, and the participant management module 304 adds the user to the multi-party communication session accordingly. In one embodiment, an advertisement associated with a multi-party communication session includes a plurality of selection elements, and responsive to the selection of a first selection element, the participant management module 304 adds the user as an active participant, and responsive to the selection of a second selection element, the participant management module 304 adds the user as a passive participant.

In one embodiment, a passive participant is a participant who can view and/or listen to the multi-party communication session but is not seen and/or heard by the other participants, i.e., in one embodiment, a passive participant receives unilateral communication from the active participants of the multi-party communication session. In one embodiment, an active participant is a participant who can be seen and/or heard by other participants in the multi-party communication session in addition to viewing and/or listening to the multi-party communication session, i.e., in one embodiment, an active participant sends and receives bilateral communications of the multi-party communication session. In one embodiment, only an active participant may ask or respond to a question. In one embodiment, the moderator is an active participant.

In one embodiment, a multi-party communication session is public allowing any user to join the multi-party communication session. In some embodiments, the participant management module 304 adds a user to a multi-party communication session subject to user log-in. For example, in one embodiment, a user must log into the multi-party communication space server 170 in order to join a multi-party communication session.

The participant management module 304 removes a participant from the multi-party communication session. For example, the participant management module 304 removes a participant from the multi-party communication session when the user logs off or responsive to a request of a moderator to remove the participant from the multi-party communication session.

The session management module 306 includes code and routines for managing a multi-party communication session. In one embodiment, the session management module 306 is a set of instructions executable by the processor 206. In another embodiment, the session management module 306 is stored in the memory 208 and is accessible and executable by the processor 206. In either embodiment, the session management module 306 is adapted for cooperation and communication with the processor 206, other components of the computing device 200 and other components of the multi-party communication application 109.

The session management module 306 manages a multi-party communication session. Examples of managing a multi-party communication session include, but are not limited to, one or more of queuing participants, maintain the decorum of the multi-party communication session, etc.

In one embodiment, the session management module 306 includes an optional decorum module (not shown). The decorum module performs one or more disciplinary actions. Examples of disciplinary actions include, but are not limited to, one or more of muting a participant, removing a participant from the multi-party communication session, etc. In one embodiment, a disciplinary action is performed by the decorum module responsive to receiving a request from a primary user. For example, assume a moderator requests that a disruptive or otherwise badly behaved participant be removed from the multi-party communication session. In one embodiment, the decorum module removes that participant or co-ordinates with the participant management module 304 to have that participant removed from the multi-party communication session.

In one embodiment, the multi-party communication session is a question and answer multi-party communication session. A question and answer multi-party communication session is occasionally referred to herein as a "QA session." A QA session is a multi-party communication session that includes a question and answer format where a participant asks a question and receives an answer from another participant. In one embodiment, the multi-party communication session associated with an advertisement is a QA session.

In one embodiment, the session management module 306 includes an optional queuing module (not shown). In one embodiment, the session management module 306 queues participants of a QA session. For example, in one embodiment, the session management queues participants of a QA session and participants each ask a question in the order queued so that each participant is given an opportunity to ask his/her question and receive an answer. In one embodiment, the primary user answers questions in a QA session. For example, the moderator answers each participant's questions in order. In one embodiment, any active participant can answer another participant's question. For example, when a person reaches the front of the queue he/she asks a question and the other participants, which may or may not include the moderator, answer the question, discuss alternative answers, etc.

The session recording module 308 includes code and routines for recording a multi-party communication session. In one embodiment, the session recording module 308 is a set of instructions executable by the processor 206. In another embodiment, the session recording module 308 is stored in the memory 208 and is accessible and executable by the processor 206. In either embodiment, the session recording module 308 is adapted for cooperation and communication with the processor 206, other components of the computing device 200 and other components of the multi-party communication application 109.

The session recording module 308 records the multi-party communication session as multi-party session data. For example, the session recording module 308 receives the video and audio streams of the participants of the QA session and stores the streams as multi-party communication session data, which is occasionally referred to herein as "session data." In one embodiment, the session recording module 308 records a multi-party communication session that is a QA session associated with an advertisement.

According to some embodiments, a QA session may last for hours and include scores of questions and answers about various different topics. For example, assume that the QA session includes a moderator associated with a laundry detergent company, in one embodiment, the session recording module records the QA session which lasts the duration of the moderator's shift and includes the moderator's answers to dozens of questions including, for example, how to remove various specific laundry stains including blood, grass, grease and red wine stains, the advantages and disadvantages of front-load and top-load washers, the difference between high efficiency laundry detergent and regular laundry detergent, the advantages and disadvantages of cold water detergents, etc.

In one embodiment, the session recording module 308 passes the session data to one or more of the QA module 310 and the moment module 312. For example, the session recording module 308 is communicatively coupled to the QA module 310 to send the session data to one or more of the QA module 310 and the moment module 312. In another embodiment, the session recording module 308 (or the communication interface 302) stores the session data in the storage device 214 (or any other non-transitory storage medium communicatively accessible). The other modules of the multi-party communication application 109 including one or more of the QA module 310 and the moment module 312 can retrieve the session data by accessing the storage device 214 (or other non-transitory storage medium).

The QA module 310 includes code and routines for segmenting the multi-party communication session data into question and answer units, which are occasionally referred to herein as "QA units." In one embodiment, the QA module 310 is a set of instructions executable by the processor 206. In another embodiment, the QA module 310 is stored in the memory 208 and is accessible and executable by the processor 206. In either embodiment, the QA module 310 is adapted for cooperation and communication with the processor 206, other components of the computing device 200 and other components of the multi-party communication application 109. Details describing the functionality and components of the QA module 310 are explained in further detail below with regard to FIG. 4.

In one embodiment, a QA unit is a portion of the multi-party communication session data that includes a recording of a participant's question and the response to that question. For example, assume the multi-party communication session data is the session data of the QA session from the example above, in one embodiment, the QA module segments the multi-party communication session data into multiple QA units so that a first QA unit includes the data regarding how to remove a blood stain, a second QA unit includes the data regarding how to remove a grass stain, a third QA unit includes the data regarding how to remove a grease stain, a forth QA unit includes the data regarding how to remove a red wine stain, a fifth QA unit includes the data regarding the advantages and disadvantages of front-load and top-load washers and so forth.

Separating the multi-party communication session data into QA units may provide a number of advantages. For example, assume that a common laundry question is how to remove a grass stain. In one embodiment, a QA unit that includes the data of the question "How do I remove a grass stain?" and the moderator's response may be linked on a frequently asked questions ("FAQ") webpage or search results page for a search associated with grass stain removal. A user may then select the link and view the response without viewing/listening to irrelevant portions of a previously recorded multi-party communication session until the moderator addresses grass stain removal and without joining an in-progress QA session and waiting for the opportunity to ask about removing grass stains. In other words, the segmentation of session data may generate content that enables a user to efficiently receive an answer to the user's questions without having to either wait in a multi-party communication session queue to ask a question or play a multi-party communication session recording until the portion of the session relevant to the user's question plays.

The segmentation of session data may enable a moderator to direct a participant to a QA unit including a previously recorded response to a previously asked, similar question, thereby reducing the amount of time moderators spend repeating themselves and increasing the number of different topics and questions addressed. Additionally, the segmentation of session data may increase the amount of positive exposure a brand/company associated with the moderator and QA session receive by its involvement in the creation and subsequent play back of QA units. For example, assume the QA unit about removing grass stains is displayed in search results for removing grass stains. The laundry detergent company may earn customer goodwill by having one of its employees wearing the company's logo explaining best practices for removing a grass stain from clothing appear in a QA unit that appears in Internet search results. Additional details describing the functionality and components of the QA module 310 are explained in further detail below with regard to FIG. 4.

The moment module 312 includes code and routines for identifying one or more notable moments from video data. In one embodiment, the moment module 312 is a set of instructions executable by the processor 206. In another embodiment, the moment module 312 is stored in the memory 208 and is accessible and executable by the processor 206. In either embodiment, the moment module 312 is adapted for cooperation and communication with the processor 206, other components of the computing device 200 and other components of the multi-party communication application 109.

The identification of notable moments by the moment module 312 may beneficially increase the ease with which a photographer captures a moment on film. For example, rather than having people pose for a picture and take one or more photographs hoping that the subjects are all smiling and no one blinks when the photograph is taken, a video may be recorded as video data and, in one embodiment, the moment module 312 identifies a video frame from the video data in which all the subjects are smiling and no one's eyes are closed and presents that image as a notable moment. In another example, rather than trying to capture a photograph the moment a batter makes contact with the baseball, a video may be recorded as video data and, in one embodiment, the moment module 312 identifies a video frame from the video data in based on the crack of the bat (i.e., a volume spike) and presents an image of that video frame. The identification of notable moments by the moment module 312 may beneficially decrease the amount of time spent editing a video. For example, assume a video of a speech includes a joke, rather than a user manually editing the video to create a video clip including the joke. In one embodiment, the moment module 312 identifies laughter in the video data and presents a video clip including a portion of video preceding the laughter. Details describing the functionality and components of the moment module 312 are explained in further detail below with regard to FIG. 7.

Figure 4:
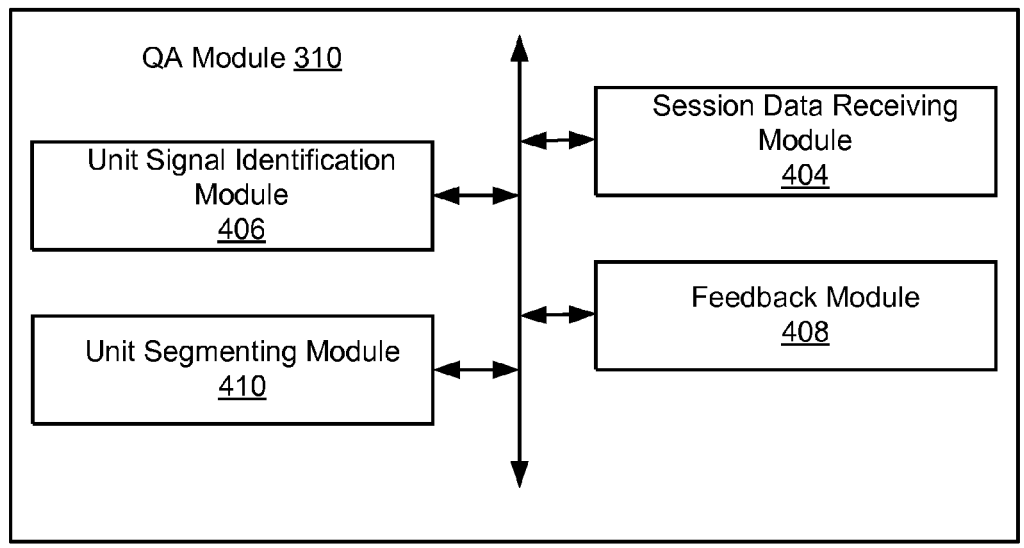
FIG. 4 is a block diagram illustrating a question and answer module according to one embodiment.

Referring now to FIG. 4, the QA module 310 is shown in more detail according to one embodiment. FIG. 4 is a block diagram of the QA module 310 of the multi-party communication application 109 according to one embodiment.

In one embodiment, the QA module 310 includes a session data receiving module 404, a unit signal identification module 406, an optional feedback module 408 and a unit segmenting module 410.

The session data receiving module 404 includes code and routines for receiving multi-party communication session data. In one embodiment, the session data receiving module 404 is a set of instructions executable by the processor 206. In another embodiment, the session data receiving module 404 is stored in the memory 208 and is accessible and executable by the processor 206. In either embodiment, the session data receiving module 404 is adapted for cooperation and communication with the processor 206, other components of the computing device 200 and other components of the multi-party communication application 109 and QA module 310.

The session data receiving module 404 receives the multi-party communication session data. In one embodiment, the session data receiving module receives the session data in real-time. For example, in one embodiment, the session data receiving module 404 receives the session data as the session data is being recorded by the session recording module 308. Such an embodiment may beneficially allow for synchronous (i.e., while the multi-party communication session is still in progress) identification of unit signals by the unit signal identification module 406 and segmentation of the session data into QA units by the unit segmenting module 410. In another embodiment, the identification of unit signals by the unit signal identification module 406 and segmentation of the session data into QA units by the unit segmenting module 410 is asynchronous with the multi-party communication session. For example, in one embodiment, the session data receiving module 404 receives the session data when the multi-party communication session has ended. For example, when a multi-party communication session has ended, in one embodiment, the session recording module 308 sends the session data, and the session data receiving module 404 receives the session data responsive to the multi-party communication session ending.

In one embodiment, the session data receiving module 404 sends the multi-party communication session data to the unit signal identification module 406. For example, the session data receiving module 404 is communicatively coupled to the unit signal identification module 406 to send the multi-party communication session data to the unit signal identification module 406. In another embodiment, the session data receiving module 404 (or the communication interface 302) stores the multi-party communication session data in the storage device 214 (or any other non-transitory storage medium communicatively accessible). The other components of the QA module 310 including the unit signal identification module 406 can retrieve the multi-party communication session data by accessing the storage device 214 (or other non-transitory storage medium).

The unit signal identification module 406 includes code and routines for identifying one or more unit signals. In one embodiment, the unit signal identification module 406 is a set of instructions executable by the processor 206. In another embodiment, the unit signal identification module 406 is stored in the memory 208 and is accessible and executable by the processor 206. In either embodiment, the unit signal identification module 406 is adapted for cooperation and communication with the processor 206, other components of the computing device 200 and other components of the multi-party communication application 109 and QA module 310.

The unit signal identification module 406 identifies one or more unit signals. In one embodiment, a unit signal is a signal that indicates one or more of the end of a response to a question and the beginning of a question. In one embodiment, the unit signal identification module 406 identifies the one or more unit signals with a timestamp. Examples of unit signals include one or more of a moderator unit signal and a social cue.

In one embodiment, a unit signal is a moderator unit signal. A moderator unit signal is a signal received from the moderator that a response to a question is complete, that a question is beginning or both. Examples of moderator unit signals include one or more of a queuing signal and a moderator marker. For example, assume participants are queued in the QA session by the session management module 306 and that when the moderator advances the queue, the next participant in the queue asks his/her question. In one embodiment, the unit signal identification module 406 receives the moderator's advancement of the queue as a queuing signal that indicates the previous participant's question has been answered and the next participant is about to ask a question, and the signal identification module 406 generates a timestamp indicating when the moderator advanced the queue. In another example, assume a unit marker button is displayed to the moderator in a graphical user interface, which the moderator selects when a question begins and/or a response is complete. In one embodiment, the unit signal identification module 406 identifies a unit signal based on the selection of the unit marker button.

In one embodiment, a unit signal is a social cue. A social cue is an indicator that a human would recognize as an indication that a question is being asked or a response to a question is complete. In one embodiment, a social cue is based on one or more of a gesture and speech. For clarity and convenience, examples of social cues based on speech are in English. However, it will be recognized that social cues may vary by language and culture and that the implementation of this description is not limited to merely one language or culture.

In one embodiment, a social cue based on speech is based on one or more of diction and speech metrics. To summarize and simplify, in one embodiment, a social cue based on speech is based on one or more of what is said (i.e., diction) and how it is said (i.e., speech metrics). In one embodiment, a social cue based on speech is based at least in part on the diction of the speech. Examples of diction of the speech indicating the beginning of a question include, but are not limited to, one or more of a participant stating "My question is," "I was wondering," "Should/can/may I," "Can/Could/Would you," "Who," "What," "Where," "Why," "How," etc. Examples of speech indicating the response to a question is complete include but are not limited to one or more of a participant/moderator stating "Any other questions," "Can I help you with anything else," "Next question," "Does that answer your question" followed by a "Yes," etc.

In one embodiment, a social cue based on speech is based at least in part on one or more speech metrics. For example, assume a person's cadence slows when posing a question. In one embodiment, the unit signal identification module 406 identifies when a participant's cadence slows with a timestamp. In another example, assume that in the QA session the moderator is a participant that answers questions and other participants are muted while waiting to ask a question. In one embodiment, the unit signal identification module 406 determines that a different participant is speaking (e.g., based on one or more of pitch, tone, communication channel, etc.) and identifies a unit signal indicating the previous participant's response was complete when the different participant began talking and time stamping that the different participant's question began when he/she began speaking.

In one embodiment, a social cue is based at least in part on gestures. For example, assume that the QA session includes video and that a participant leans forward when the participant begins to ask a question. In one embodiment, the unit signal identification module 406 determines when a participant leans forward and generates a timestamp associated with when the participant leaned forward. In another example, assume that the QA session includes video and that a participant's hand gestures are more frequent and pronounced when responding to a question. In one embodiment, the unit signal identification module 406 determines when a participant's gestures are reduced in frequency or proportion and generates a timestamp indicating that a response is complete.

In one embodiment, the unit signal identification module 406 identifies the one or more unit signals using a learning algorithm. In one embodiment, the learning algorithm is trained based at least in part on moderator unit signals. For example, in one embodiment, the unit signal identification module 406 receives the moderator unit signals and trains the learning algorithm to recognize social cues that precede or follow the moderator unit signal. In one embodiment, the unit signal identification module 406 subsequently uses the algorithm to automatically identify unit signals.

In one embodiment, the unit signal includes an indicator of whether the unit signal is the end of a response, a question's beginning or both. Such indicators may beneficially allow extraneous data to be eliminated. For example, assume that after a first participant's question is answered a second participant introduces himself/herself and asks a question. In one embodiment, the unit signal identification module 406 identifies the completion of the response to the first participant's question with a first indicator type, and identifies the beginning of the second participant's question with a second indicator type. In one such embodiment, the unit segmenting module 410, which is discussed below, segments the session data so data associated with the introduction of the second participant between the first indicator type and the second indicator type (i.e., extraneous data) is not included in a QA unit.

In one embodiment, the unit signal identification module 406 sends the one or more identified unit signals to one or more of the feedback module 408 and the unit segmenting module 410. For example, the unit signal identification module 406 is communicatively coupled to one or more of the feedback module 408 and the unit segmenting module 410 to send the one or more identified unit signals to one or more of the feedback module 408 and the unit segmenting module 410. In another embodiment, the unit signal identification module 406 (or the communication interface 302) stores the one or more identified unit signals in the storage device 214 (or any other non-transitory storage medium communicatively accessible). The other components of the QA module 310 including one or more of the feedback module 408 and the unit segmenting module 410 can retrieve the one or more identified unit signals by accessing the storage device 214 (or other non-transitory storage medium).

The feedback module 408 includes code and routines for receiving feedback regarding the one or more identified unit signals. In one embodiment, the feedback module 408 is a set of instructions executable by the processor 206. In another embodiment, the feedback module 408 is stored in the memory 208 and is accessible and executable by the processor 206. In either embodiment, the feedback module 408 is adapted for cooperation and communication with the processor 206, other components of the computing device 200 and other components of the multi-party communication application 109 and QA module 310.

The feedback module 408 receives user feedback regarding the identified unit segment signals. Depending on the embodiment, the feedback module 408 receives feedback before or after the session data is segmented by the unit segmenting module 410. Depending on the embodiment, the feedback may be implicit or explicit.

In one embodiment, the feedback module 408 presents a user with a GUI and plays a portion (e.g., 2-5 seconds) of the session immediately preceding and/or following an identified unit signal and receives feedback from a user verifying whether the unit signal is correct (i.e., the unit signal identifies the end of a response and/or beginning of a question within the session data). In one such embodiment, the feedback module 408 sends the one or more verified unit signals to the unit segmenting module 410. Such embodiments beneficially allow verification that unit signals are properly identified without having to play large portions of the session data thereby saving time.

In one embodiment, when a unit signal is incorrect, the feedback module 408 receives feedback correcting the unit signal by moving or eliminating the incorrect unit signal. In one such embodiment, the feedback module 408 sends one or more corrected unit signals to the unit segmenting module 410. In one embodiment, verification is implicit. For example, in one embodiment, when the feedback module 408 does not receive feedback correcting the unit signal, the one or more unit signals are implicitly verified.

In one embodiment, the feedback received by the feedback module 408 is used to modify the algorithm used by the unit signal identification module 406 to automatically identify unit signals. In one such embodiment, the feedback module 408 sends feedback to the unit signal identification module 406, which modifies a learning algorithm. Such embodiments may beneficially increase the future accuracy of automatic identification of unit signals by the unit signal identification module 406, which may beneficially reduce or eliminate user verification, correction or manual identification of unit signals.

In one embodiment, the feedback module 408 sends feedback to the unit signal identification module 406. For example, the feedback module 408 is communicatively coupled to the unit signal identification module 406 to send feedback to the unit signal identification module 406. In another embodiment, the feedback module 408 (or the communication interface 302) stores feedback in the storage device 214 (or any other non-transitory storage medium communicatively accessible). The other components of the QA module 310 including the unit signal identification module 406 can retrieve the feedback by accessing the storage device 214 (or other non-transitory storage medium).

In one embodiment, the feedback module 408 sends one or more of a verified unit signal and a corrected unit signal to the unit segmenting module 410. For example, the feedback module 408 is communicatively coupled to the unit segmenting module 410 to send one or more of a verified unit signal and a corrected unit signal to the unit segmenting module 410. In another embodiment, the feedback module 408 (or the communication interface 302) stores one or more of the verified unit signal and the corrected unit signal in the storage device 214 (or any other non-transitory storage medium communicatively accessible). The other components of the QA module 310 including the unit segmenting module 410 can retrieve one or more of the verified unit signal and the corrected unit signal by accessing the storage device 214 (or other non-transitory storage medium).

The unit segmenting module 410 includes code and routines for segmenting the multi-party communication session data based on the one or more unit signals. In one embodiment, the unit segmenting module 410 is a set of instructions executable by the processor 206. In another embodiment, the unit segmenting module 410 is stored in the memory 208 and is accessible and executable by the processor 206. In either embodiment, the unit segmenting module 410 is adapted for cooperation and communication with the processor 206, other components of the computing device 200 and other components of the multi-party communication application 109 and QA module 310.

The unit segmenting module 410 segments the multi-party communication session data based on the one or more unit signals. In one embodiment, the unit segmenting module 410 segments the session data based at least in part on the one or more unit signals identified by the unit signal identification module 406. For example, in one embodiment, the unit segmenting module 410 receives the session data recorded by the session recording module 308, the one or more unit signals identified by the unit signal identification module 406, and generates and stores a plurality of segments of session data based at least in part on the identified unit signals.

In one embodiment, the unit segmenting module 410 segments the session data based at least in part on one or more unit signals verified or corrected by the feedback module 408. For example, assume that feedback is received prior to segmentation, in one embodiment, the unit segmenting module 410 receives the session data recorded by the session recording module 308 and the verified and/or corrected unit signals from the feedback module 408 and generates and stores a plurality of segments of session data based at least in part on the verified and/or corrected unit signals.

In one embodiment, un-segmented session data is not retained once the session data is segmented. In another embodiment, a copy of the un-segmented session data is retained. For example, in one embodiment, un-segmented session data is retained incase a unit signal is incorrect and the session data must be re-segmented using a corrected unit signal.

In one embodiment, the QA module beneficially reduces the time and effort required to segment audio and/or video in post-production. In another embodiment, the QA module beneficially eliminates the need to segment audio and/or video in post-production all together. Regardless of the embodiment, the QA module beneficially provides automation and the associated efficiencies in segmentation that are important at scale.

In one embodiment, the unit segmenting module 410 sends the QA units for presentation. For example, the session data unit segmenting module 410 is communicatively coupled to a user device 115 to send QA units to the user device 115 for presentation. In another embodiment, the unit segmenting module 410 (or the communication interface 302) stores the QA units in the storage device 214 (or any other non-transitory storage medium communicatively accessible). The other components of the system 100 including the user devices 115 can retrieve the QA units by accessing the storage device 214 (or other non-transitory storage medium).

Figure 5:
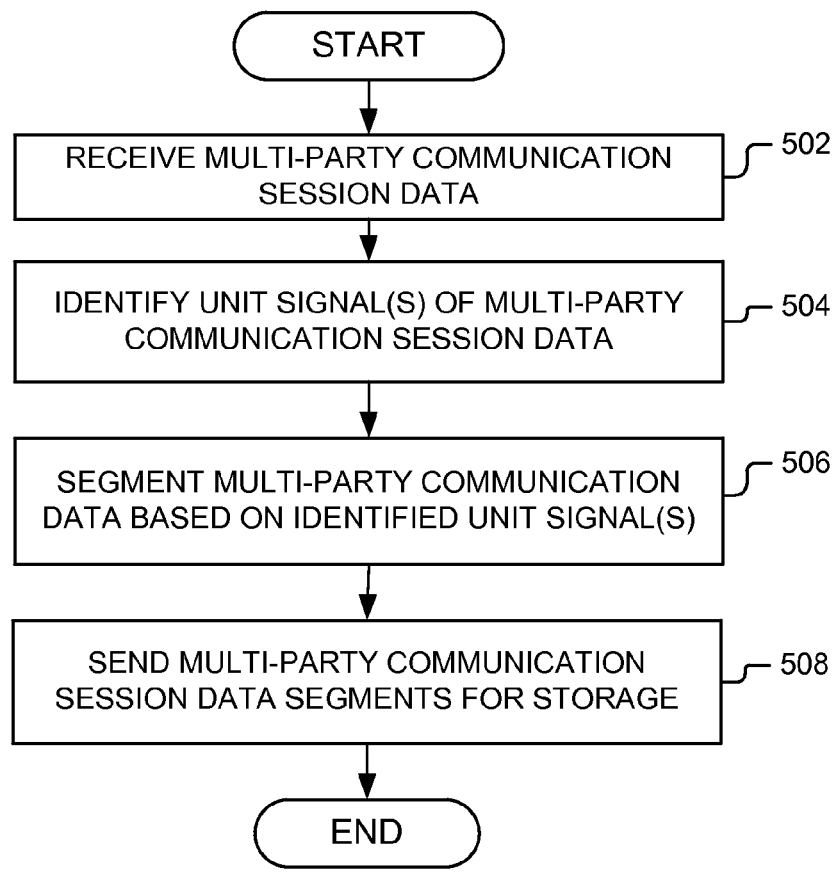
FIG. 5 is a flow chart illustrating a method for segmenting a recording of a multi-party communication session into question and answer units according to one embodiment.
Figure 6:
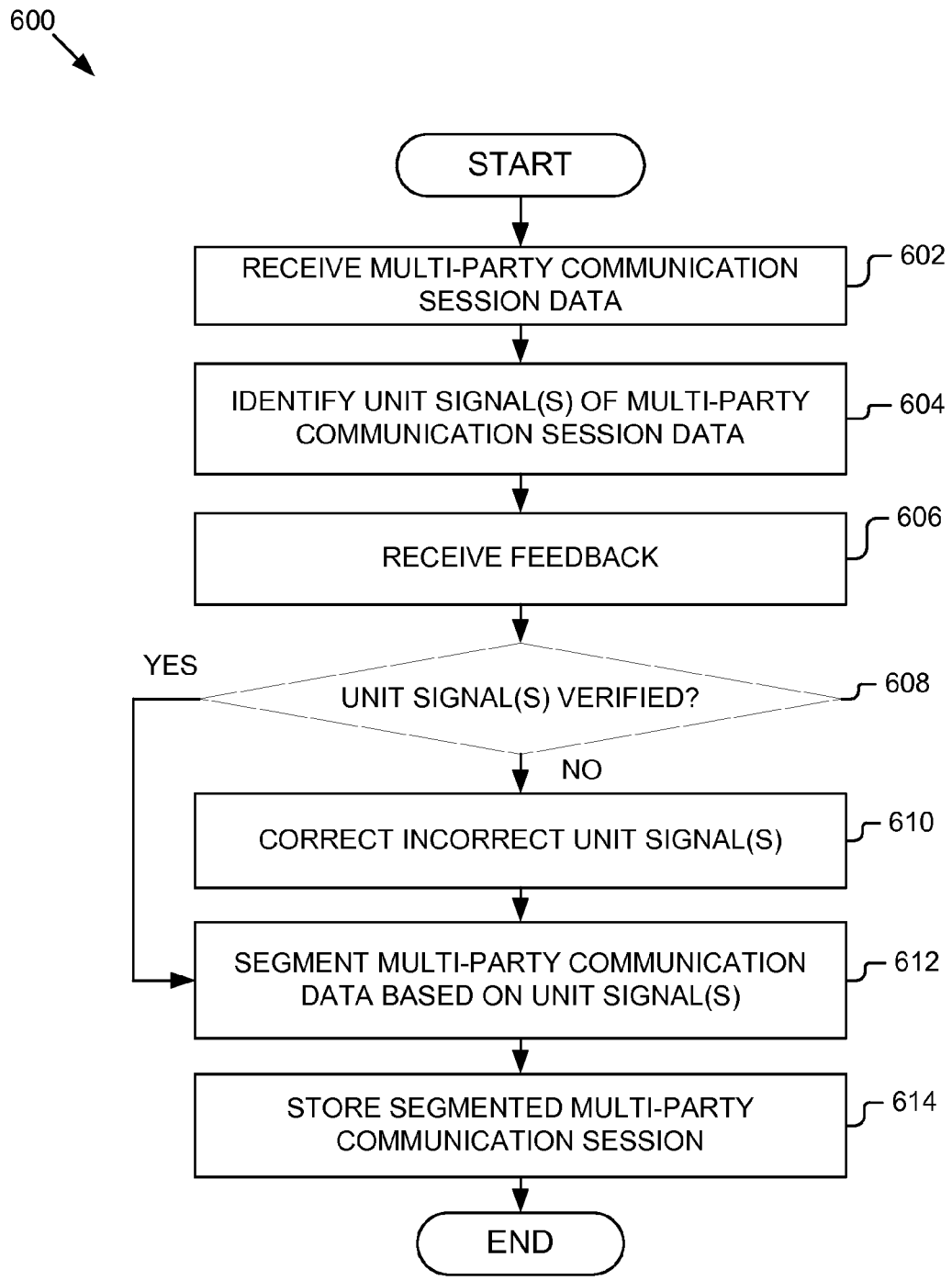
FIG. 6 is a flow chart illustrating another method for segmenting a recording of a multi-party communication session into question and answer units according to one embodiment.

FIGS. 5 and 6 depict various methods 500, 600 performed by the system described above in regard to FIGS. 1-4.

FIG. 5 is a flow chart illustrating a method 500 for segmenting a recording of a multi-party communication session into question and answer units according to one embodiment. At block 502, the session data receiving module 404 of the QA module 310 receives multi-party communication session data. At block 504, the unit signal identification module 406 identifies one or more unit signals of the multi-party communication session data. At block 506, the unit segmenting module 410 segments the multi-party communication session data based on the one or more unit signals identified at block 504. At block 508, unit segmenting module 410 sends the multi-party communication session data segments for storage.

FIG. 6 is a flow chart illustrating another method 600 for segmenting a recording of a multi-party communication session into question and answer units according to one embodiment. At block 602, the session data receiving module 404 of the QA module 310 receives multi-party communication session data. At block 604, the unit signal identification module 406 identifies one or more unit signals of the multi-party communication session data. At block 606, the feedback module 408 receives feedback. At block 608, the feedback module 408 determines whether the one or more unit signals identified at block 604 are verified based on the feedback received at block 606.

If the feedback module 408 determines that the one or more unit signals identified at block 604 are verified based on the feedback received at block 606 (608—Yes), the method 600 continues at block 612. If the feedback module 408 determines that at least one of the one or more unit signals identified at block 604 are not verified based on the feedback received at block 606 (608—No), the method 600 continues at block 610. At block 610, the feedback module 408 corrects the at least one of the one or more of the unit signals based on the feedback received at block 606. At block 612, the unit segmenting module 410 segments the multi-party communication session data based on unit signals verified at block 608 and/or unit signals corrected at block 610. At block 614, unit segmenting module 410 sends the multi-party communication session for storage.

Figure 7:
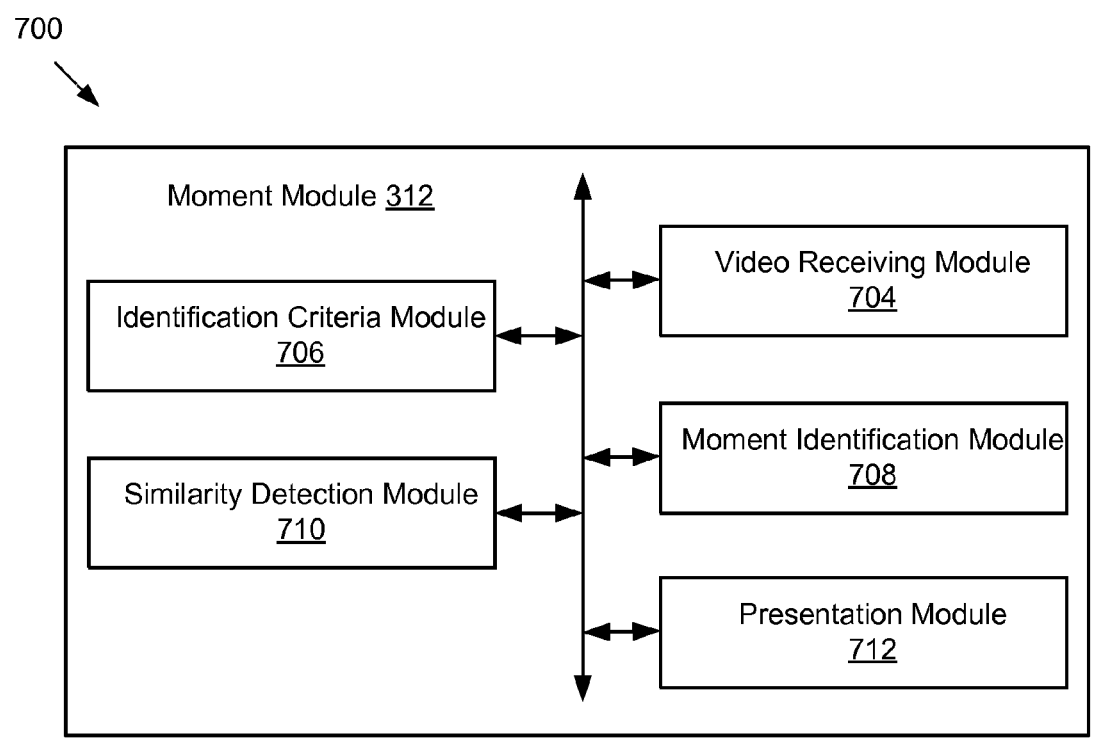
FIG. 7 is a block diagram illustrating a moment module according to one embodiment.

Referring now to FIG. 7, the moment module 312 is shown in more detail according to one embodiment. In one embodiment, the moment module 312 is included in the multi-party communication application 109 as illustrated in FIG. 3. In another embodiment, the moment module 312 is an independent module separate and apart from the multi-party communication application 109, which may be included in one or more of the servers and user devices 115 of the system 100 (not shown).

In one embodiment, the moment module 312 includes a video receiving module 704, an identification criteria module 706, a moment identification module 708, a similarity detection module 710, and a presentation module 712. In one embodiment, the modules of the moment module 312 are not all included on the same computing device 200.

The video receiving module 704 includes code and routines for receiving video data. In one embodiment, the video receiving module 704 is a set of instructions executable by the processor 206. In another embodiment, the video receiving module 704 is stored in the memory 208 and is accessible and executable by the processor 206. In either embodiment, the video receiving module 704 is adapted for cooperation and communication with the processor 206, other components of the computing device 200 and other components of the moment module 312.

The video receiving module 704 receives video data. In one embodiment, the video receiving module 704 receives video data of a multi-party communication session. For example, assuming that a multi-party communication session includes video and that the moment module 312 is communicatively coupled to the session recording module 308, in one embodiment, the video receiving module 704 receives multi-party communication session data including a recording of a multi-party communication session (i.e., video data) from the session recording module 308 of the multi-party communication application 109.

In another embodiment, the video receiving module 704 receives video uploaded by a user. For example, assume a user uploads a wedding video (i.e., video data) to a social network associated with the social network server 190. In one embodiment, the video receiving module 704 is communicatively coupled to receive the video data from the social network server 190. In another example, assume a user uploads a wedding video (i.e. video data) to a third party application server 107. In one embodiment, the video receiving module 704 is communicatively coupled to receive the video data. In one embodiment, the video receiving module 704 receives video data of a user uploaded video responsive to a user uploading the video. For example, in one embodiment, the video receiving module 704 automatically receives video data and the moment module 312 automatically identifies notable moments based at least in part on the video data responsive to a user uploading the video data.

In yet another embodiment, the moment module 312 is a client side application and the video receiving module 704 receives video data from a storage device 214 of a user device 115. For example, assuming the user selects video data stored on the user's user device 115, in one embodiment, the video receiving module 704 is communicatively coupled to receive the selected video data.

In one embodiment, the video receiving module 704 receives synchronous video data, which may allow for the synchronous identification of a notable moment. For example, in one embodiment, the video receiving module 704 receives video data of a live multi-party communication session from the session recording module 308 and notable moments are identified as the video data is received. In another embodiment, the video receiving module 704 receives asynchronous video data, and the identification of a notable moment is asynchronous. For example, assume that the video data is of a multi-party communication session, in one embodiment, the video receiving module 704 receives video data of a multi-party communication session from the session recording module 308 after the multi-party communication session has concluded (i.e., asynchronously), and notable moments are subsequently identified. In another example, assume that the video data is of wedding video uploaded by a user. In one embodiment, the video receiving module 704 receives the video data and notable moments are subsequently identified. Description of the identification of a notable moment is provided in further detail below.

In one embodiment, the video receiving module 704 sends the video data to the moment identification module 708. For example, the video receiving module 704 is communicatively coupled to the moment identification module 708 to send the video data to the moment identification module 708. In another embodiment, the video receiving module 704 (or the communication interface 302) stores the video data in the storage device 214 (or any other non-transitory storage medium communicatively accessible). The other components of the moment module 312 including the moment identification module 708 can retrieve the video data by accessing the storage device 214 (or other non-transitory storage medium).

The identification criteria module 706 includes code and routines for determining one or more criteria for identifying a notable moment. In one embodiment, the identification criteria module 706 is a set of instructions executable by the processor 206. In another embodiment, the identification criteria module 706 is stored in the memory 208 and is accessible and executable by the processor 206. In either embodiment, the identification criteria module 706 is adapted for cooperation and communication with the processor 206, other components of the computing device 200 and other components of the moment module 312.

The identification criteria module 706 determines one or more criteria for identifying a notable moment. In one embodiment, the one or more criteria for identifying a notable moment are based at least in part on one or more of an audio indicator and a facial indicator. An audio indicator is an audible indication that a moment is a notable moment. Examples of an audio indicator include, but are not limited to, one or more of applause, laughter, cheering, jeering, booing, gasps, an excited squeal, a volume spike, etc. It will be recognized that the preceding are merely examples of audio indicators and other examples exist. A facial indicator is a visual indication that a moment is a notable moment based at least in part on a facial feature. Examples of a facial indicator include, but are not limited to, one or more of the presence of at least one face, a face directed toward the camera (e.g., detecting the presence of both eyes), open eyes, a smile, an open mouth, raised eyebrows, a facial expression, etc. It will be recognized that the preceding are merely examples of facial indicators and other examples exist.

In one embodiment, at least one criterion for identifying a notable moment is based at least in part on machine learning. For example, assume examples of laughter are provided to train a learning algorithm to recognize laughter as an audio indicator. In one embodiment, the algorithm identifying laughter is a criterion for identifying a notable moment. In another example, examples of human faces are provided to train one or more learning algorithms to recognize when a human face is present, when a human face has open eyes, when a human face is facing the camera (e.g., both eyes are visible) and when a human face is smiling. In one embodiment, the algorithm(s) identifying when one or more faces are present, facing the camera with open eyes and a smile are criteria for identifying a notable moment. In yet another example, examples of human faces having a facial expression (e.g., surprise) are provided to train one or more learning algorithms to recognize a person's emotional reaction based at least in part on facial expression. In one embodiment, the algorithms identifying based at least in part on facial expression that a person has a particular emotional reaction is criteria for identifying a notable moment.

In one embodiment, the one or more criteria determined by the identification criteria module 706 are non-user selectable. In another embodiment, the identification criteria module 706 determines the one or more criteria for identifying a notable moment based on a user's selection. For example, in one embodiment, the identification criteria module 706 presents the one or more criteria to a user (e.g., a moderator of a multi-party communication server, a social network user, etc.), receives a selection of one or more criteria from a user 125 and determines that the one or more criteria selected by the user are the one or more criteria for identifying a notable moment. In one embodiment, the one or more criteria are individually selectable. For example, the identification criteria module 706 presents each criterion individually. For example, assume a user wants moments that include a surprise to be identified as notable moments. Also assume that wide, open eyes, an open mouth, raised and arched eyebrows, a shriek, gasp or spike in volume alone or in combination indicate a surprised emotional reaction. In one embodiment, the identification criteria module 706 presents and the user individually selects criteria including one or more of detecting wide, open eyes, an open mouth, raised eyebrows, arched eyebrows, a shriek, a gasp, and a spike in volume.

In one embodiment, the one or more criteria determined by the identification criteria module 706 are determined using machine learning based at least in part on user feedback. For example, assume that during a training phase or using a feedback mechanism a user identifies a notable moment. For example, the user selects a GUI button during playback of a video to mark the beginning of a video clip and selects the GUI button again to mark the end of the video clip which contains a notable moment. In another example, the user selects a GUI button that slows video playback to a frame-by-frame playback and the user selects a second GUI button to capture frames. In one embodiment, the identification criteria module 706 receives the user's selection (e.g., video clip and/or video frames) and uses the user's selection to train a learning algorithm, which the identification criteria module 706 uses to automatically determine one or more criteria. For example, the identification criteria module 706 analyzes the video frame(s) and/or audio of the user's selection (or those surrounding the user's selection) to train a learning algorithm to identify a notable moment. Such an embodiment may beneficially use the selections made by multiple users to determine the criteria and/or weightings thereof such that the moments identified by the moment identification module 708 are those a user would have selected manually, thereby saving the user's time and effort.

In another embodiment, the one or more criteria are grouped. For example, assume, again, that the user wants moments that include a surprise to be identified as notable moments. In one embodiment, the identification criteria module 706 presents and the user selects a button associated with the emotional reaction surprise and that button is associated with criteria including one or more of detecting wide, open eyes, an open mouth, raised and arched eyebrows, a shriek, a gasp, and a spike in volume.

In one embodiment, the identification criteria module 706 sends the one or more criteria to the moment identification module 708. For example, the identification criteria module 706 is communicatively coupled to the moment identification module 708 to send the one or more criteria to the moment identification module 708. In another embodiment, the identification criteria module 706 (or the communication interface 302) stores the one or more criteria in the storage device 214 (or any other non-transitory storage medium communicatively accessible). The other components of the moment module 312 including the moment identification module 708 can retrieve the one or more criteria by accessing the storage device 214 (or other non-transitory storage medium).

The moment identification module 708 includes code and routines for identifying at least one notable moment. In one embodiment, the moment identification module 708 is a set of instructions executable by the processor 206. In another embodiment, the moment identification module 708 is stored in the memory 208 and is accessible and executable by the processor 206. In either embodiment, the moment identification module 708 is adapted for cooperation and communication with the processor 206, other components of the computing device 200 and other components of the moment module 312.

The moment identification module 708 identifies at least one notable moment. In one embodiment, the moment identification module 708 identifies at least one notable moment of the video data based at least in part on the one or more criteria determined by the identification criteria module 706. A notable moment is based at least in part on a subset of the video data. Examples of notable moments include, but are not limited to, one or more of an image and a video clip.

For example, assume the moment identification module 708 receives a wedding video (i.e., video data) from the video receiving module 704 and one or more criteria from the identification criteria module 706 including laughter and a person facing the camera and smiling with open eyes. In one embodiment, the moment identification module 708 identifies an image based on a video frame (i.e., a subset of) video data. For example, the moment identification module 708 identifies a video frame in which all the wedding attendees in the video frame are smiling and facing the camera with open eyes. In another embodiment, the moment identification module 708 identifies a video clip from the video data (i.e., a subset of the video data). For example, the moment identification module 708 identifies a moment when the attendees of the wedding begin laughing as a memorable moment.

In one embodiment, the moment identification module 708 identifies a video clip from the video data based on the one or more criteria, and the video clip includes a portion based on video data preceding and/or following the moment identified based on the one or more criteria. For example, assume the video data includes the speech of the best man at a wedding and the speech includes a humorous moment. In one embodiment, the moment identification module 708 identifies a video clip as a memorable moment and that video clip includes when the laughter begins and a portion based on the video data preceding the laughter. Such embodiments may beneficially provide context for the identifiable moment. For example, what caused the laughter, applause, surprised reaction, etc. and/or what followed. Depending on the embodiment, the portion preceding and/or following the notable moment may vary. For example, the portion may be a predetermined amount of time (e.g., five seconds), a predetermined number of video frames (e.g., 200 frames), the duration of the person speaking prior to the notable moment (e.g., a person's commentary which caused laughter, surprise, applause, etc.). It will be recognized that the preceding are merely examples of the portion preceding and/or following a notable moment and that other examples exist.

In one embodiment, the moment identification module 708 sends the at least one notable moment to one or more of the similarity detection module 710 and the presentation module 712. For example, the moment identification module 708 is communicatively coupled to one or more of the similarity detection module 710 and the presentation module 712 to send the at least one notable moment to one or more of the similarity detection module 710 and the presentation module 712. In another embodiment, the moment identification module 708 (or the communication interface 302) stores the at least one notable moment in the storage device 214 (or any other non-transitory storage medium communicatively accessible). The other components of the moment module 312 including one or more of the similarity detection module 710 and the presentation module 712 can retrieve the at least one notable moment by accessing the storage device 214 (or other non-transitory storage medium).

The similarity detection module 710 includes code and routines for selecting a similar notable moment from a plurality of notable moments including at least two similar notable moments. In one embodiment, the similarity detection module 710 is a set of instructions executable by the processor 206. In another embodiment, the similarity detection module 710 is stored in the memory 208 and is accessible and executable by the processor 206. In either embodiment, the similarity detection module 710 is adapted for cooperation and communication with the processor 206, other components of the computing device 200 and other components of the moment module 312.

The similarity detection module 710 selects a similar notable moment from a plurality of notable moments including at least two similar notable moments. In one embodiment, the similarity detection module 710 determines whether a plurality of notable moments includes similar notable moments. In one embodiment, the similarity detection module 710 compares a plurality of notable moments identified by the moment identification module 708 to one another and determines whether two or more notable moments from the plurality of notable moments are similar, i.e., in one embodiment, the similarity detection module 710 determines whether a plurality of notable moments includes similar notable moments. For example, assume the one or more criteria include a person facing the camera with open eyes and a smile and that the moment identification module 708 identifies three images of a person smiling from video frames of the video data (i.e., three notable moments). In one embodiment, the similarity detection module 710 receives the three images and, responsive to receiving the three images, compares the three images to one another to determine whether the three images are similar.

In one embodiment, the similarity detection module 710 determines whether notable moments are similar or different based at least in part on one or more of facial recognition, time stamps, histogram matching, etc. In one embodiment, the similarity detection module 710 applies facial recognition and determines that two notable moments are similar when the two notable moments include the face(s) of the same person(s).

In one embodiment, the similarity detection module 710 determines that two notable moments are similar based in part on the notable moments being proximate or overlapping time stamps. For example, the similarity detection module 710 uses time stamps to determine that the notable moments are images based on video frames that are consecutive or within a predetermined number or frames or time of one another. In another example, the similarity detection module 710 uses time stamps to determine that the notable moments are similar when the video clips include a predetermined number or portion of identical video frames. In one embodiment, similar video clips with overlapping time stamps and/or identical video frames are combined into a single larger video clip.

In one embodiment, the similarity detection module 710 uses histogram matching to determine that two notable moments are similar. For example, in one embodiment, the similarity detection module 710 generates histograms based on the notable moments that are images and compares the histograms. When the histograms match, in one embodiment, the similarity detection module 710 determines that the notable moments associated with the histograms are similar. It will be recognized that the preceding are merely example bases for determining whether notable moments are similar and that other examples exist.

The similarity detection module 710 selects a similar notable moment from a plurality of notable moments including at least two similar notable moments. In one embodiment, the similarity detection module 710 selects a similar notable moment from at least two similar notable moments based at least in part on one or more bases. Examples of bases include, but are not limited to, one or more of color saturation, contrast, focus, rule of thirds, two points of focus, straight horizon, golden mean, etc. It will be recognized that the preceding bases are merely examples of bases and that other bases exist including additional bases based on principles of visual composition. For example, assume the similar notable moments are images based on a video frame. In one embodiment, the similarity detection module 710 selects the first similar notable moment based on the first similar notable moment having a desired color saturation level. For example, assume slight over saturation is desired, in one embodiment, the similarity detection module 710 selects the first similar notable moment when the first similar notable moment is a slightly over saturated image and the other similar notable moments are under saturated. In another example, assume it is desirable to have any faces in a photo in focus, in one embodiment, the similarity detection module 710 selects the first similar notable moment when the first similar notable moment is an image including a face that's in focus and the other similar notable moments are images where the face is less in focus.

In one embodiment, the similarity detection module 710 selects a similar notable moment from at least two similar notable moments based at least in part on a learning algorithm. For example, assume that during a training phase or using a feedback mechanism, when at least two similar notable moments are presented to a user, the user selects a similar notable moment and the similarity detection module 710 receives the user's selection; in one embodiment, the similarity detection module 710 uses the user's selection to train a learning algorithm, which is subsequently used to automatically select a similar notable moment. Such an embodiment may beneficially use the selections made by multiple users to determine the bases and/or weightings thereof such that the similarity detection module 710 may automatically identify a similar identifiable moment, which the user would have selected manually, thereby saving the user's time and effort.

In one embodiment, the similarity detection module 710 sends the selected similar notable moment(s) to the presentation module 712. For example, the similarity detection module 710 is communicatively coupled to the presentation module 712 to send the selected similar notable moment(s) to the presentation module 712. In another embodiment, the similarity detection module 710 (or the communication interface 302) stores the selected similar notable moment(s) in the storage device 214 (or any other non-transitory storage medium communicatively accessible). The other components of the moment module 312 including the presentation module 712 can retrieve the selected similar notable moment(s) by accessing the storage device 214 (or other non-transitory storage medium).

In one embodiment, the similarity detection module 710 sends the different notable moment(s) to the presentation module 712. For example, the similarity detection module 710 is communicatively coupled to the presentation module 712 to send the different notable moment(s) to the presentation module 712. In another embodiment, the similarity detection module 710 (or the communication interface 302) stores the different notable moment(s) in the storage device 214 (or any other non-transitory storage medium communicatively accessible). The other components of the moment module 312 including the presentation module 712 can retrieve the different notable moment(s) by accessing the storage device 214 (or other non-transitory storage medium).

The presentation module 712 includes code and routines for sending at least one notable moment for presentation to at least one user. In one embodiment, the presentation module 712 is a set of instructions executable by the processor 206. In another embodiment, the presentation module 712 is stored in the memory 208 and is accessible and executable by the processor 206. In either embodiment, the presentation module 712 is adapted for cooperation and communication with the processor 206, other components of the computing device 200 and other components of the moment module 312.

The presentation module 712 sends at least one notable moment for presentation to at least one user. In one embodiment, the presentation module 712 obtains the notable moments identified by the moment identification module 708 and sends the identifiable moments for display to at least one user. For example, the presentation module 712 receives the notable moments including duplicates and sends the notable moments for display to a user 125 (e.g., a moderator of the multi-party communication session associated with the video data or the user that uploaded the video data) via the user's user device 115. In one embodiment, the user may manually eliminate undesired notable moments. For example, the user manually selects the images and/or video clips that the user desires and does not select similar notable moments.

In another embodiment, the presentation module 712 obtains the selected similar notable moment(s) and the different notable moments from the similarity detection module 710 and sends those notable moments for display to at least one user. In one embodiment, the user may manually eliminate undesired notable moments. For example, the user manually selects the images and/or video clips that the user desires.

In one embodiment, the presentation module 712 sends at least one notable moment for presentation. For example, the presentation module 712 is communicatively coupled to a user device 115 to send the at least one notable moment to the user device 115 for presentation. In another embodiment, the presentation module 712 (or the communication interface 302) stores the at least one notable moment in the storage device 214 (or any other non-transitory storage medium communicatively accessible). The other components of the system 100 including the user devices 115 can retrieve the at least one notable moment by accessing the storage device 214 (or other non-transitory storage medium).

In one embodiment, a user may save and/or distribute a notable moment. For example, the user may save the video clips and images on a user device 115 or on a server in association with a user profile. In one embodiment, the presentation module 712 automatically distributes at least one notable moment to a plurality of users. In one embodiment, the presentation module 712 distributes the notable moments via e-mail, via a social network, private message, multi-media text message, etc. For example, assume the video data is of a multi-party communication session associated with an advertisement; in one embodiment, a notable moment is automatically posted to a content stream associated with a social network profile of the company associated with the multi-party communication session. In another example, assume the video data is of a multi-party communication session; in one embodiment, a notable moment is automatically distributed to each of the participants of the multi-party communication session via one or more of e-mail, private message and associating the notable moment with a participant's social network profile. In yet another example, in one embodiment, a notable moment is automatically distributed to a contact list via e-mail.

Figure 8:
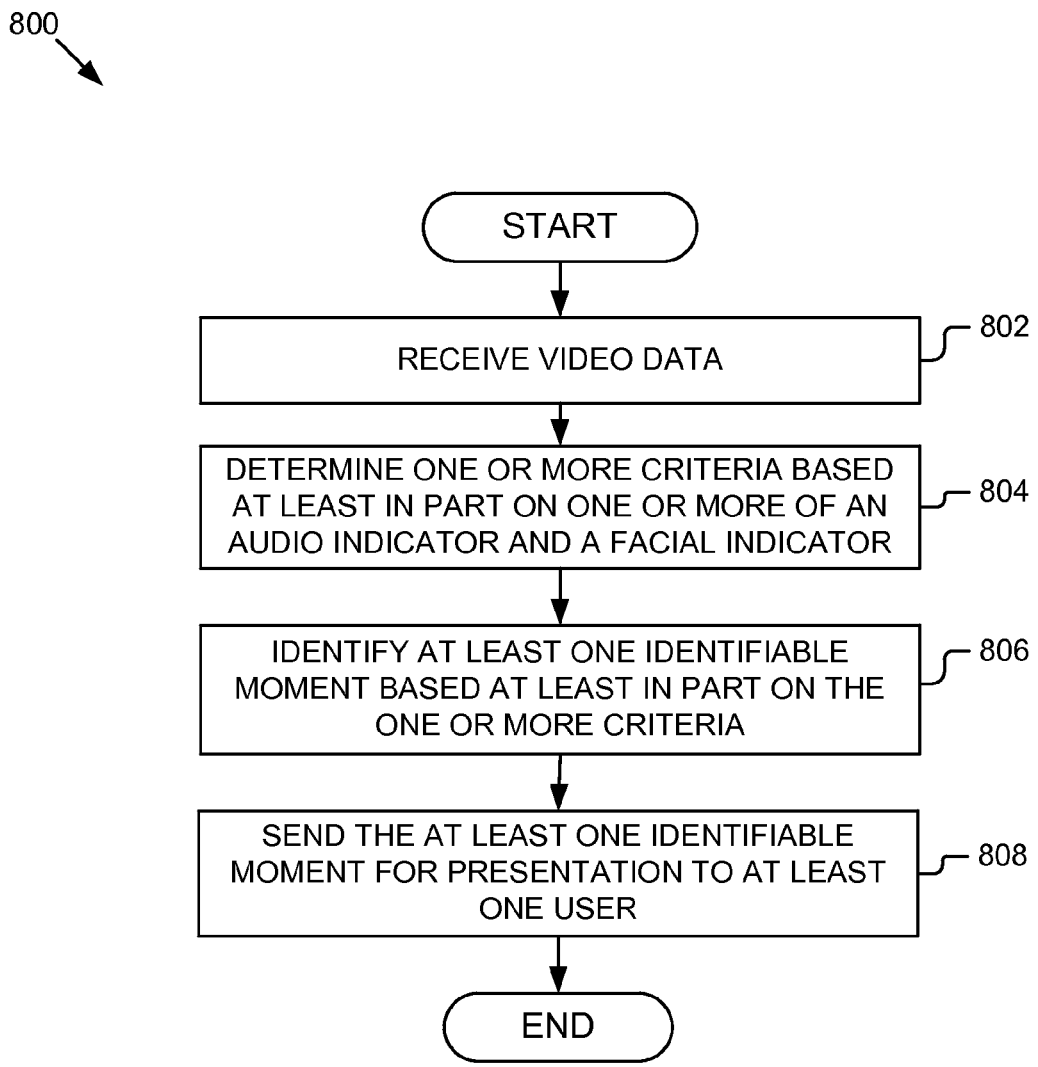
FIG. 8 is a flow chart illustrating a method for identifying one or more notable moments from video data according to one embodiment.
Figure 9:
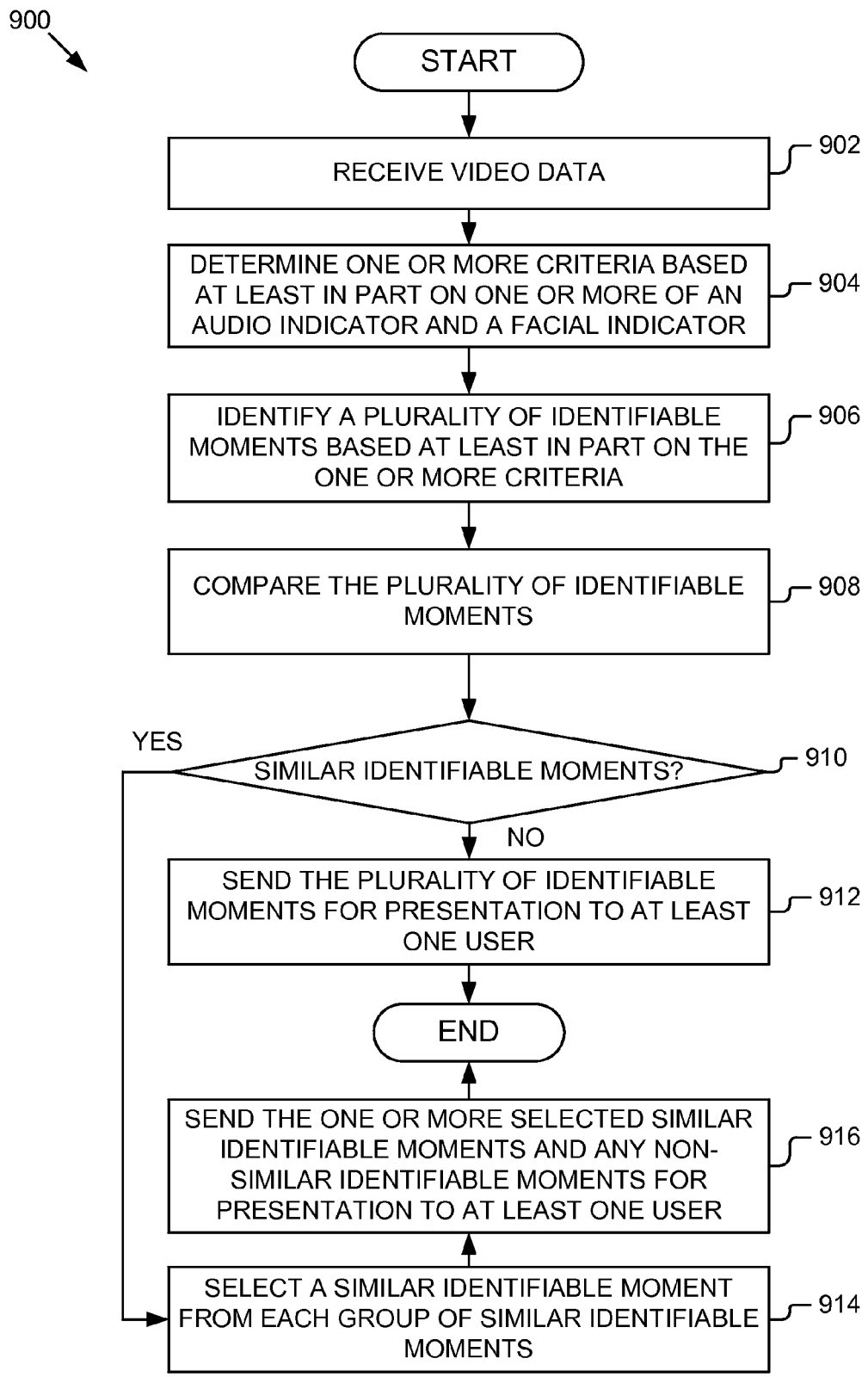
FIG. 9 is a flow chart illustrating a method for identifying one or more notable moments from video data according to one embodiment.

In one embodiment, the presentation module 712 sends at least one notable moment for distribution. For example, the presentation module 712 is communicatively coupled to one or more of an e-mail server 123, a third party application server and a social network server to send the at least one notable moment to one or more of an e-mail server 123, a third party application server and a social network server for distribution. In another embodiment, the presentation module 712 (or the communication interface 302) stores the at least one notable moment in the storage device 214 (or any other non-transitory storage medium communicatively accessible). The other components of the system 100 including one or more of an e-mail server 123, a third party application server and a social network server can retrieve the at least one notable moment by accessing the storage device 214 (or other non-transitory storage medium). FIGS. 8 and 9 depict various methods 800, 900 performed by the system described above in regard to FIGS. 1-3 and 7.

FIG. 8 is a flow chart illustrating a method 800 for identifying one or more notable moments from video data according to one embodiment. At block 802, the video receiving module 704 of the moment module 312 receives video data. At block 804, the identification criteria module 706 determines one or more criteria for identifying a notable moment. The one or more criteria are based at least in part on one or more of an audio indicator and a facial indicator. At block 806, the moment identification module 708 identifies at least one notable moment in the video data based at least in part on the one or more criteria determined at block 804. At block 808, the presentation module 712 sends the at least one notable moment, identified at block 806, for presentation to at least one user.

FIG. 9 is a flow chart illustrating another method 900 for identifying one or more notable moments from video data according to one embodiment. At block 902, the video receiving module 704 of the moment module 312 receives video data. At block 904, the identification criteria module 706 determines one or more criteria for identifying a notable moment. The one or more criteria are based at least in part on one or more of an audio indicator and a facial indicator. At block 906, the moment identification module 708 identifies a plurality of notable moments in the video data based at least in part on the one or more criteria determined at block 804. At block 908, the similarity detection module 710 compares the plurality of notable moments identified at block 906. At block 910, the similarity detection module 710 determines whether at least two notable moments are similar.

If the similarity detection module 710 determines that at least two of the notable moments, identified at block 906, are similar (910—Yes), the method 900 continues at block 914. If the similarity detection module 710 determines that no notable moments, identified at block 906, are similar (910—No), the method 600 continues at block 912. At block 912, the presentation module 712 sends the plurality of notable moments for presentation to at least one user. At block 914, the similarity detection module 710 selects a similar notable moment from each group of similar notable moments. At block 916, the presentation module 712 sends the one or more similar notable moments selected at block 914 and any non-similar notable moments for presentation to at least one user.

The foregoing description of the embodiments has been presented for the purposes of illustration and description. It is not intended to be exhaustive or to limit the present embodiments to the precise forms disclosed. Many modifications and variations are possible in light of the above teaching. It is intended that the scope of the present embodiments be limited not by this detailed description, but rather by the claims of this application. As will be understood by those familiar with the art, the present embodiments may take other specific forms without departing from the spirit or essential characteristics thereof. Likewise, the particular naming and division of the modules, routines, features, attributes, methodologies, and other aspects are not mandatory or significant, and the mechanisms that implement one embodiment or its features may have different names, divisions and/or formats. Furthermore, as will be apparent, the modules, routines, features, attributes, methodologies, and other aspects of the embodiments can be implemented as software, hardware, firmware, or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the embodiments are in no way limited to implementation in any specific programming language, or for any specific operating system or environment. Accordingly, the disclosure is intended to be illustrative, but not limiting, of the scope, which is set forth in the following claims.

What is claimed is:

1. A computer-implemented method comprising:
   receiving, by one or more computing devices, a video;
   receiving, by the one or more computing devices, from a first user, a selection of a type of emotional reaction;
   determining, by the one or more computing devices, a first criteria for identifying a plurality of notable moments, the first criteria being based on a facial expression indicator;
   determining, by the one or more computing devices, a second criteria for identifying the plurality of notable moments, the second criteria being based on an audio indicator including a spike in volume;
   identifying, by the one or more computing devices, a first notable moment in a first portion of the video and a second notable moment in a second portion of the video based on the first criteria;
   identifying, by the one or more computing devices, in the video, a first video clip of a first duration including the first notable moment and a second video clip of a second duration including the second notable moment based on the second criteria;
comparing, by the one or more computing devices, the first notable moment and the second notable moment;
determining, based on comparing the first notable moment and the second notable moment, whether the first notable moment and the second notable moment include the selected type of emotional reaction;
responsive to determining that the first notable moment and the second notable moment include the selected type of emotional reaction, combining the first video clip of the first duration including the first notable moment and the second video clip of the second duration including the second notable moment into a third video clip;
identifying, by the one or more computing devices, a presence of a second user in the video; and
responsive to identifying the presence of the second user in the video, transmitting for display on a user device of the second user, the third video clip to the second user.

2. The method of claim 1, wherein the video is a video data stream and identifying the first notable moment and the second notable moment is synchronous with the reception of the video data stream.

3. The method of claim 1, wherein the video is a live video stream from a multi-party communication session including the first user as a moderator and the second user as a participant.

4. The method of claim 1, wherein the audio indicator includes one from a group of a volume spike, applause, and laughter.

5. The method of claim 1, wherein the facial expression indicator is based on facial recognition and includes one from a group of a presence of a human face, the presence of the human face in focus, the presence of the human face having open eyes, and the presence of the human face with a smiling expression.

6. The method of claim 1, wherein the first notable moment and the second notable moment are selected based on one or more of color saturation, contrast, focus, rule of thirds, two points of focus, straight horizon, and golden mean.

7. A system comprising:
one or more processors;
a video receiving module stored on a memory and executable by the one or more processors to receive a video;
an identification criteria module stored on the memory and executable by the one or more processors to receive, from a first user, a selection of a type of emotional reaction, determine a first criteria for identifying a plurality of notable moments, the first criteria being based on a facial expression indicator, and to determine a second criteria for identifying the plurality of notable moments, the second criteria being based on an audio indicator including a spike in volume, the identification criteria module communicatively coupled to receive the first criteria and the second criteria;
a moment identification module stored on the memory and executable by the one or more processors to identify a first notable moment in a first portion of the video and a second notable moment in a second portion of the video based on the first criteria, and to identify, in the video, a first video clip of a first duration including the first notable moment and a second video clip of a second duration including the second notable moment based on the second criteria;
a similarity detection module stored on the memory and executable by the one or more processors to compare the first notable moment and the second notable moment, determine whether the first notable moment and the second notable moment include the selected type of emotional reaction based on comparing the first notable moment and the second notable moment, and combine the first video clip of the first duration including the first notable moment and the second video clip of the second duration including the second notable moment into a third video clip responsive to determining that the first notable moment and the second notable moment include the selected type of emotional reaction, the similarity module communicatively coupled to receive the first video clip and the second video clip;
a participant management module stored on the memory and executable by the one or more processors to identify a presence of a second user in the video; and
a presentation module stored on the memory and executable by the one or more processors to transmit for display the third video clip to the second user on a user device of the second user responsive to identifying the presence of the second user in the video.

8. The system of claim 7, wherein the first notable moment and the second notable moment are selected based on one or more of color saturation, contrast, focus, rule of thirds, two points of focus, straight horizon, and golden mean.

9. The system of claim 7, wherein the video is a video data stream and the moment identification module is configured to identify the first notable moment and the second notable moment synchronously with the reception of the video data stream.

10. The system of claim 7, wherein the video is a live video stream from a multi-party communication session including the first user as a moderator and the second user as a participant.

11. The system of claim 7, wherein the audio indicator includes one from a group of a volume spike, applause and laughter.

12. The system of claim 7, wherein the facial expression indicator is based on facial recognition and includes one from a group of a presence of a human face, the presence of the human face in focus, the presence of the human face having open eyes, and the presence of the human face with a smiling expression.

13. The method of claim 1, further comprising receiving, from the first user, a selection of a third notable moment, and wherein determining the first criteria and the second criteria is based on the selection of the third notable moment.

14. The system of claim 7, wherein the identification criteria module is configured to receive, from the first user, a selection of a third notable moment, and wherein the identification criteria module is configured to determine the first criteria and the second criteria based on the selection of the third notable moment.

15. The method of claim 1, wherein comparing the first notable moment and the second notable moment includes determining whether the first notable moment and the second notable moment have overlapping timestamps.

16. The system of claim 7, wherein the similarity detection module is configured to compare the first notable moment and the second notable moment based on determining whether the first notable moment and the second notable moment have overlapping timestamps.

17. The method of claim 1, wherein comparing the first notable moment and the second notable moment includes determining whether a first histogram based on the first notable moment is similar to a second histogram based on the second notable moment.

18. The system of claim 7, wherein the similarity detection module is configured to compare the first notable moment and the second notable moment based on determining whether a first histogram based on the first notable moment is similar to a second histogram based on the second notable moment.

19. The method of claim 1, wherein transmitting the third video clip to the second user comprises posting the third video clip to a content stream in a social network profile of the second user.

20. The system of claim 7, wherein the presentation module is configured to transmit the instructions for posting the third video clip to a content stream in a social network profile of the second user.

* * * * *